United States Patent
Giroux et al.

(10) Patent No.: US 12,544,959 B2
(45) Date of Patent: Feb. 10, 2026

(54) DUAL CAST SLUSH MOLD SYSTEM, METHODS, AND APPARATUSES

(71) Applicant: CpK Interior Products Inc., Port Hope (CA)

(72) Inventors: Bruce Arthur Giroux, Port Hope (CA); Gregory James Farrar, Roblin (CA)

(73) Assignee: CpK Interior Products, Port Hope (CA)

( * ) Notice: Subject to any disclaimer, the term of this patent is extended or adjusted under 35 U.S.C. 154(b) by 213 days.

(21) Appl. No.: 18/094,499

(22) Filed: Jan. 9, 2023

(65) Prior Publication Data

US 2024/0227252 A1 Jul. 11, 2024

(51) Int. Cl.
  *B29C 41/18* (2006.01)
  *B29C 41/04* (2006.01)
  (Continued)

(52) U.S. Cl.
  CPC .............. *B29C 41/18* (2013.01); *B29C 41/04* (2013.01); *B29C 41/22* (2013.01); *B29C 41/46* (2013.01);
  (Continued)

(58) Field of Classification Search
  CPC ......... B29C 41/04; B29C 41/18; B29C 41/22; B29C 41/46; B29K 2105/043; B29K 2995/0097; B29L 2031/3041
  See application file for complete search history.

(56) References Cited

U.S. PATENT DOCUMENTS 3,542,912 A * 11/1970 Nungesser .............. B29C 41/22
  264/241
4,722,678 A 2/1988 Wersosky
  (Continued)

FOREIGN PATENT DOCUMENTS

CN 104558845 A 4/2015
EP 3992244 A1 5/2022
  (Continued)

OTHER PUBLICATIONS

Extended Search Report mailed Jun. 13, 2024, in corresponding European Patent Office Application Serial No. 24163986.3.
(Continued)

*Primary Examiner* — Jerzi H Moreno Hernandez
(74) *Attorney, Agent, or Firm* — Harness, Dickey & Pierce, P.L.C.

(57) ABSTRACT

Methods, systems, and apparatuses of manufacturing an automotive interior trim panel are provided. The method includes providing a mold having a negative side and a positive side, heating the mold using a first heater and a second heater, coupling the mold to a first powder box containing a first polymeric powder, molding a first polymer layer on the first side of the mold by rotating the mold, coupling the mold to a second powder box containing a second polymeric powder, and molding a second polymer layer on the first polymer layer by rotating the mold. The method further includes heating the second polymer layer during which the second polymer layer expands, compressing the thickness of the second polymer layer, cooling the positive side of the mold to reduce the temperature of the first polymer layer and the second polymer layer, and removing the part from the mold.

20 Claims, 21 Drawing Sheets

(51) Int. Cl.
  *B29C 41/22* (2006.01)
  *B29C 41/46* (2006.01)
  *B29K 105/04* (2006.01)
  *B29L 31/30* (2006.01)

(52) U.S. Cl.
  CPC .................. *B29K 2105/043* (2013.01); *B29K 2995/0097* (2013.01); *B29L 2031/3041* (2013.01)

(56) References Cited

U.S. PATENT DOCUMENTS

| | | | |
|---|---|---|---|
| 4,769,278 A | 9/1988 | Kamimura et al. | |
| 4,979,888 A * | 12/1990 | Bauer | B29C 41/46 264/306 |
| 5,344,183 A | 9/1994 | Hersman et al. | |
| 5,580,501 A | 12/1996 | Gallagher et al. | |
| 5,900,196 A * | 5/1999 | Cittadini | B29C 41/18 425/468 |
| 6,506,495 B1 * | 1/2003 | Enami | C08L 23/10 428/420 |
| 6,516,736 B1 | 2/2003 | Van Lancker | |
| 6,541,529 B1 * | 4/2003 | Iketani | B29C 41/18 521/85 |
| 7,560,515 B2 | 7/2009 | Tansey | |
| 8,674,027 B2 | 3/2014 | Krabbenborg | |
| 9,505,868 B2 | 11/2016 | Doneva et al. | |
| 10,723,892 B2 | 7/2020 | Walia et al. | |
| 11,577,665 B2 | 2/2023 | Reddy et al. | |
| 2003/0109601 A1 * | 6/2003 | MacDonald | B29C 41/18 264/308 |
| 2005/0184419 A1 | 8/2005 | Laws et al. | |
| 2012/0007281 A1 * | 1/2012 | Nimmergut | B29C 41/36 425/435 |
| 2015/0322244 A1 | 11/2015 | Iwahori et al. | |
| 2015/0343675 A1 * | 12/2015 | Gray | B29C 41/46 264/238 |
| 2017/0240736 A1 | 8/2017 | Farrar | |
| 2018/0215887 A1 | 8/2018 | Kohlstrung et al. | |
| 2020/0291215 A1 * | 9/2020 | Takesada | B29C 41/18 |
| 2022/0089105 A1 | 3/2022 | Reddy et al. | |
| 2022/0127447 A1 | 4/2022 | Reddy et al. | |
| 2023/0041610 A1 | 2/2023 | Patel et al. | |
| 2023/0110728 A1 | 4/2023 | Farrar et al. | |

FOREIGN PATENT DOCUMENTS

| | | | |
|---|---|---|---|
| EP | 4269060 A1 | 11/2023 | |
| GB | 1368743 A | 10/1974 | |
| GB | 2466432 A | 6/2010 | |
| JP | H0387215 A * | 4/1991 | B29C 41/18 |
| JP | 2001226542 A | 8/2001 | |
| JP | 2013505328 A | 2/2013 | |
| WO | WO 01/70476 A2 | 9/2001 | |
| WO | 2002090080 A1 | 11/2002 | |
| WO | WO 03/033589 A1 | 4/2003 | |
| WO | 2021239883 A2 | 12/2021 | |

OTHER PUBLICATIONS

Extended European Search Report Corresponding to Application No. 24163985.5, mailed May 14, 2024.

* cited by examiner

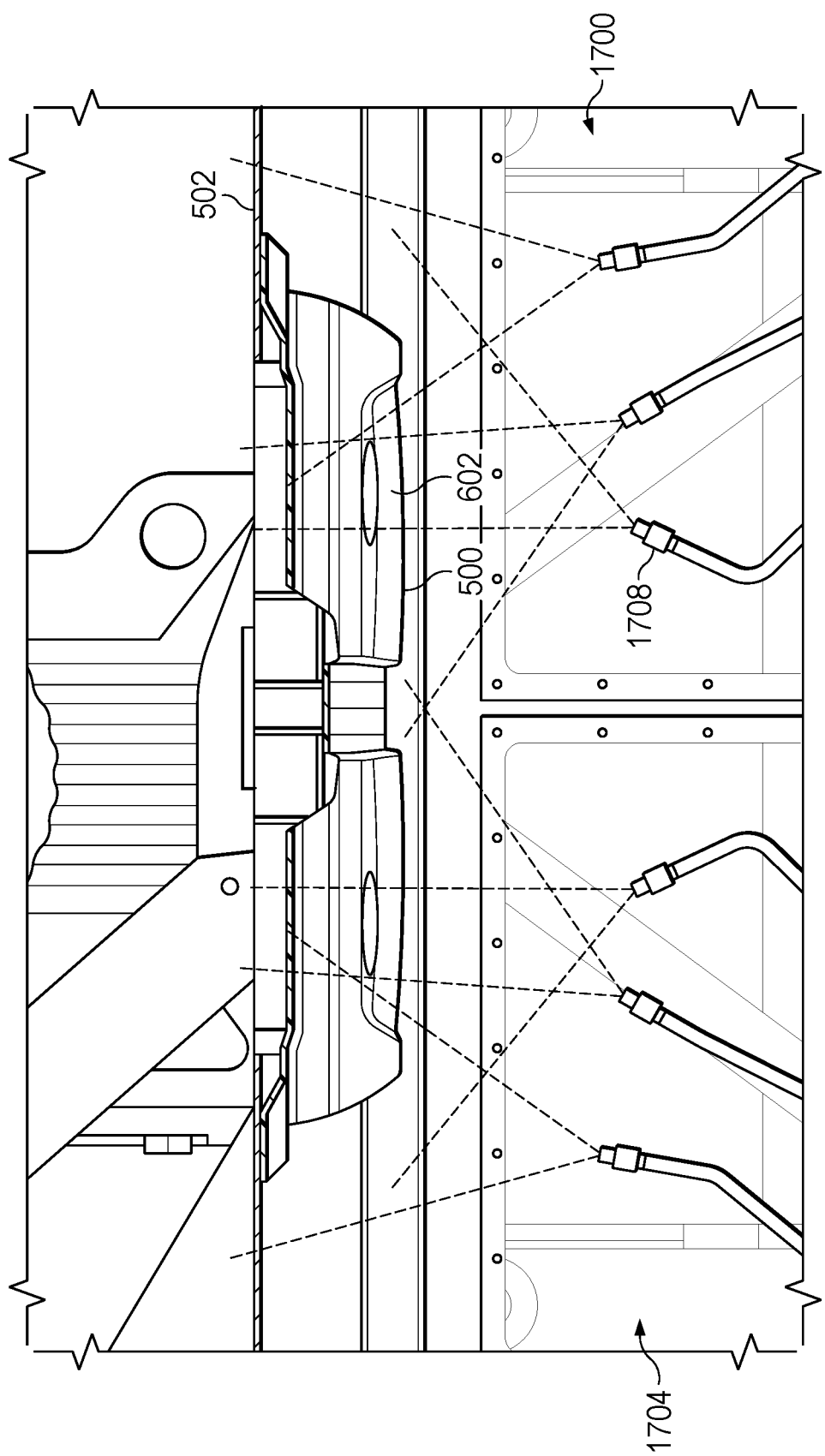

DUAL CAST SLUSH MOLD SYSTEM, METHODS, AND APPARATUSES

BACKGROUND

The present disclosure relates generally to Polyvinyl chloride (PVC)-based compositions for slush-molding shells, such as for automotive interior skins.

Traditionally, soft skins used in automotive interiors, such as for instrument panels, door uppers, consoles, and the like, are made using a slush molding process. Slush molding involves heating a mold (typically a 3-4 mm thick nickel mold), pouring a polymeric powder or resin into the heated mold, and rotating the mold. While the mold is rotating, at least a portion of the powder melts and forms to an interior surface of the mold having a desired shape. After cooling and removal from the mold, a skin having the desired shape is formed. During this process, it is important that the powder or resin flows smoothly within the mold. Polyvinyl chloride (PVC) resin, for example, has an amorphous nature that exhibits good flowability for slush molding.

Following the slush molding process, many skins are back-foamed by a foam-in-place process, which is a process through which, for example, polyurethane foam is injected and/or formed between a skin and a hard substrate, resulting in desired haptics or a desired sense of touch and feel. In some instances, following the slush molding process of the skin, a foam material taken from a calendar roll would be cut to the size of the skin then heated and glued onto the skin. The foam and skin would then be vacuum formed to create the part. This process is time consuming and leads to high levels of scrap, for example 40% of the material is scrap. Additionally, neither the materials nor the final part are recyclable.

SUMMARY

In accordance with the present invention, a method of manufacturing an automotive interior trim panel is provided. The method includes providing a mold having a negative side and a positive side, heating the mold, in a pre-cast heating step, to a pre-cast temperature, and providing a first powder box containing a first polymeric powder. The mold is then coupled to the first powder box and the mold and the first powder box are rotated in a first rotation step. During the first rotation step, at least a portion of the first polymeric powder melts and forms a first polymer layer on the negative side of the mold. The method further includes decoupling the mold from the first powder box and providing a second powder box containing a second polymeric powder. The mold is then coupled to the second powder box and the mold and the second powder box are rotated in a second rotation step. During the second rotation step, at least a portion of the second polymeric powder melts and forms a second polymer layer on the first polymer layer. The mold is decoupled from the second powder box. The method further includes heating the mold, in a post-cast heating step, to a post-cast temperature. During the post-cast heating step, the second polymer layer expands from a first thickness to a second thickness. The second polymer layer is then compressed to a third thickness. The mold is then cooled and the trim panel is removed from the mold, wherein the trim panel comprises the first polymer layer and the second polymer layer.

In accordance with the present invention, a system configured to produce a dual layer part is provided. The system includes a powder station having a first powder box and a second powder box, a heating station, a calibration station, a cooling station, a demold station, and a mold transfer system configured to move a mold to and from the powder station, the heating station, the calibration station, the cooling station, and the demold station. The mold has a first side and a second side. A part having a first polymer layer and a second polymer layer on the first polymer layer is configured to be molded on the first side of the mold. A further aspect of the system, the mold transfer system includes a pair of rails and a shuttle configured to travel on the rails. In yet another aspect of the system, the shuttle includes a horizontal motion frame configured to move along the pair of rails, a vertical motion frame configured to couple with and move vertically with respect to the horizontal motion frame, and a rotational motion frame configured to couple with and rotate with respect to the vertical motion frame. In yet another aspect of the system, the rotational motion frame is configured to rotate the mold.

In accordance with the present invention, a method of producing a part using a dual cast slush mold system is provided. The method includes loading a mold having a negative side and a positive side onto a shuttle of a mold transfer system, moving the shuttle to a heating station, the heating station having a first heater and a second heater, and heating the positive side of the mold using the first heater and heating the negative side of the mold using the second heater. The method further includes moving the shuttle to a powder station having a first powder box and a second powder box, coupling the mold to the first powder box, the first powder box containing a first polymeric powder, and molding a first polymer layer on the first side of the mold by rotating the mold. The method further includes decoupling the mold from the first powder box, coupling the mold to the second powder box, the second powder box containing a second polymeric powder, and molding a second polymer layer on the first polymer layer by rotating the mold. The method further includes moving the shuttle to the heating station and heating the second polymer layer using the second heater, during which the second polymer layer expands in thickness. The method further includes moving the shuttle to a calibration station, the calibration station comprising a calibration plug and pressing the second polymer layer and the calibration plug together to compress the thickness of the second polymer layer. The method further includes moving the shuttle to a cooling station, cooling the second side of the mold to reduce the temperature of the first polymer layer and the second polymer layer, and removing the part from the mold.

In accordance with the present invention, a part comprising a first polymer layer and a second polymer layer are manufactured according to a manufacturing method. The method includes heating a mold having a negative side and a positive side to a pre-cast temperature of about 243 degrees Celsius, coupling the mold to a first powder box containing a first polymeric powder, and rotating the mold and the first powder box, in a first rotation step, during which at least a portion of the first polymeric powder melts and forms a first polymer layer on the negative side of the mold. The method further includes decoupling the mold from the first powder box, coupling the mold to a second powder box containing a second polymeric powder, and rotating the mold and the second powder box, in a second rotation step, during which at least a portion of the second polymeric powder melts and forms a second polymer layer on the first polymer layer. The method further includes decoupling the mold from the second powder box, heating the mold to a post-cast temperature of about 180 degrees Celsius during which the second polymer layer forms into a foam, and compressing the second polymer layer to a thickness of about 2.5 mm to about 3.5 mm. The method further includes cooling the mold by spraying the positive side of the mold with a cooling fluid, and removing the part from the mold.

The systems, apparatuses, and methods described herein provide significant advantages. For example, the dual cast slush mold system is able to produce a part with a much-reduced cycle time compared to prior systems and methods. Additionally, the dual cast slush mold system is able to produce a part with a much-reduced amount of scrap and the part may be 100% recyclable. The dual cast slush mold system is able to produce a part with a better radius definition. Moreover, the systems, apparatuses, and methods described herein provide significant cost savings, for example, through the decreased cycle time, decreased scrap rates, elimination of the steps of gluing a foam layer to a skin layer, etc.

Additional features and advantages can be ascertained from the following description and appended claims taken in conjunction with the accompanying drawings.

BRIEF DESCRIPTION OF THE DRAWINGS

FIG. 23 is a partial section view of an exemplary mold placed on top of the cooling station of FIG. 17 in accordance with the present invention.

DETAILED DESCRIPTION

Figure 1:
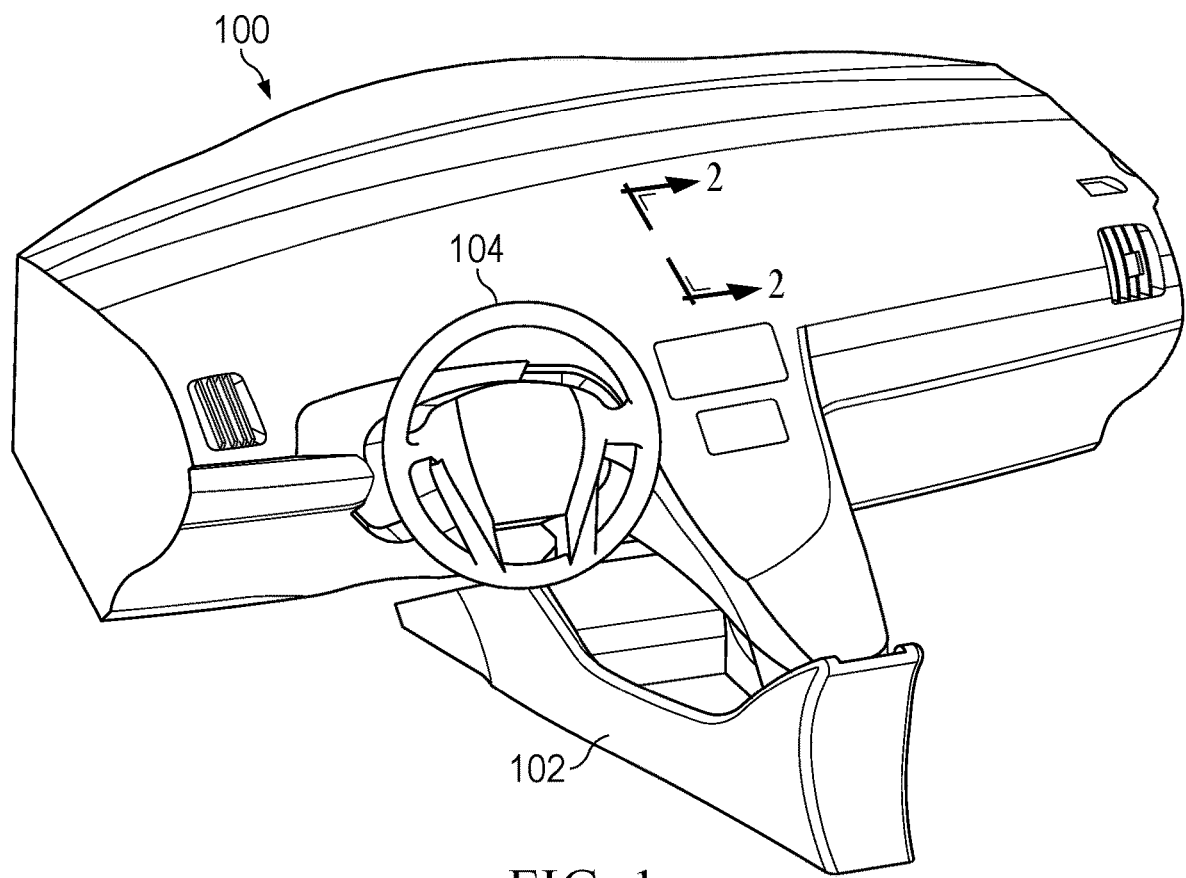
FIG. 1 is an isometric view showing an interior trim panel having a first polymer layer and a second polymer layer formed in accordance with the present invention.
Figure 2:
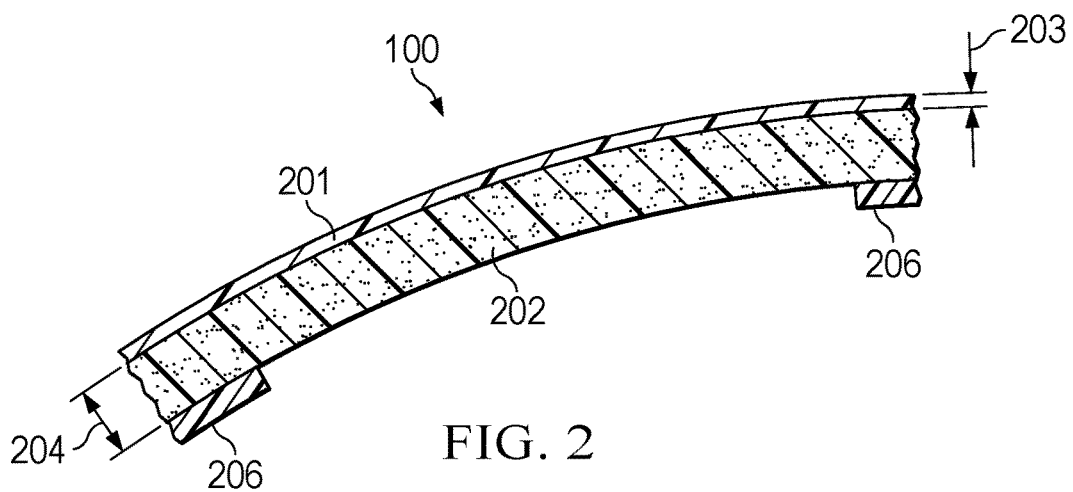
FIG. 2 is a cross-sectional view, taken along line 2-2 of FIG. 1, showing the interior trim panel.

An exemplary part formed using the systems and methods described herein is an interior trim panel for a wheeled automotive land vehicle shown in FIGS. 1 and 2. The interior trim panel is preferably an instrument panel 100, but may alternately include a center console 102, a separate airbag cover, a seamless airbag door, a door trim panel, a knee bolster, a seat mechanism cover, a pillar cover, or the like. The interior trim panels are also referred to herein as generally part 100. A steering wheel 104 is also shown in FIG. 1. The instrument panel 100 includes a first polymer layer 201 and a second polymer layer 202. The first polymer layer 201 forms the outer skin of the instrument panel 100 and includes a Class A surface. The second polymer layer 202 is a pliable foam layer. Thus the first polymer layer 201 is a skin layer and the second polymer layer 202 is a foam layer. The first polymer layer 201 has a thickness 203 in a range of about 0.5 mm to about 3.0 mm. Preferably, the thickness 203 is from about 0.5 mm to about 1.0 mm. Most preferably, the thickness 203 is about 0.6 mm. The second polymer layer 202 has a thickness 204 in a range of about 2.0 mm to about 5.0 mm. Preferably, the thickness 204 is from about 2.5 mm to about 3.0 mm. Most preferably, the thickness 204 is about 3.0 mm. The first polymer layer 201 and the second polymer layer 202 may be mounted to an inner rigid substrate 206. The steering wheel 104 may have the same general architecture as the instrument panel 100. The first polymer layer 201 and the second polymer layer 202 are formed from a first polymeric powder 921 (see FIG. 9) and a second polymeric powder 922 (see FIG. 9), respectively, using a dual cast slush mold system and process, as described herein.

In exemplary embodiments, the first polymeric powder 921 and the second polymeric powder 922 are each a Polyvinyl chloride (PVC) resin powder. In addition to PVC, the second polymeric powder 922 includes a heat stabilizer and a foaming agent. As described herein, the heat stabilizer and the foaming agent cooperate to cause the second polymer layer 202 to form a foam during the dual cast slush mold process. In particular, the heat stabilizer acts as a catalyst for the activation of the foaming agent. Additionally, uniform distribution of the heat stabilizer within the second polymeric powder 922 assists in even activation of the foaming agent.

Figure 3:
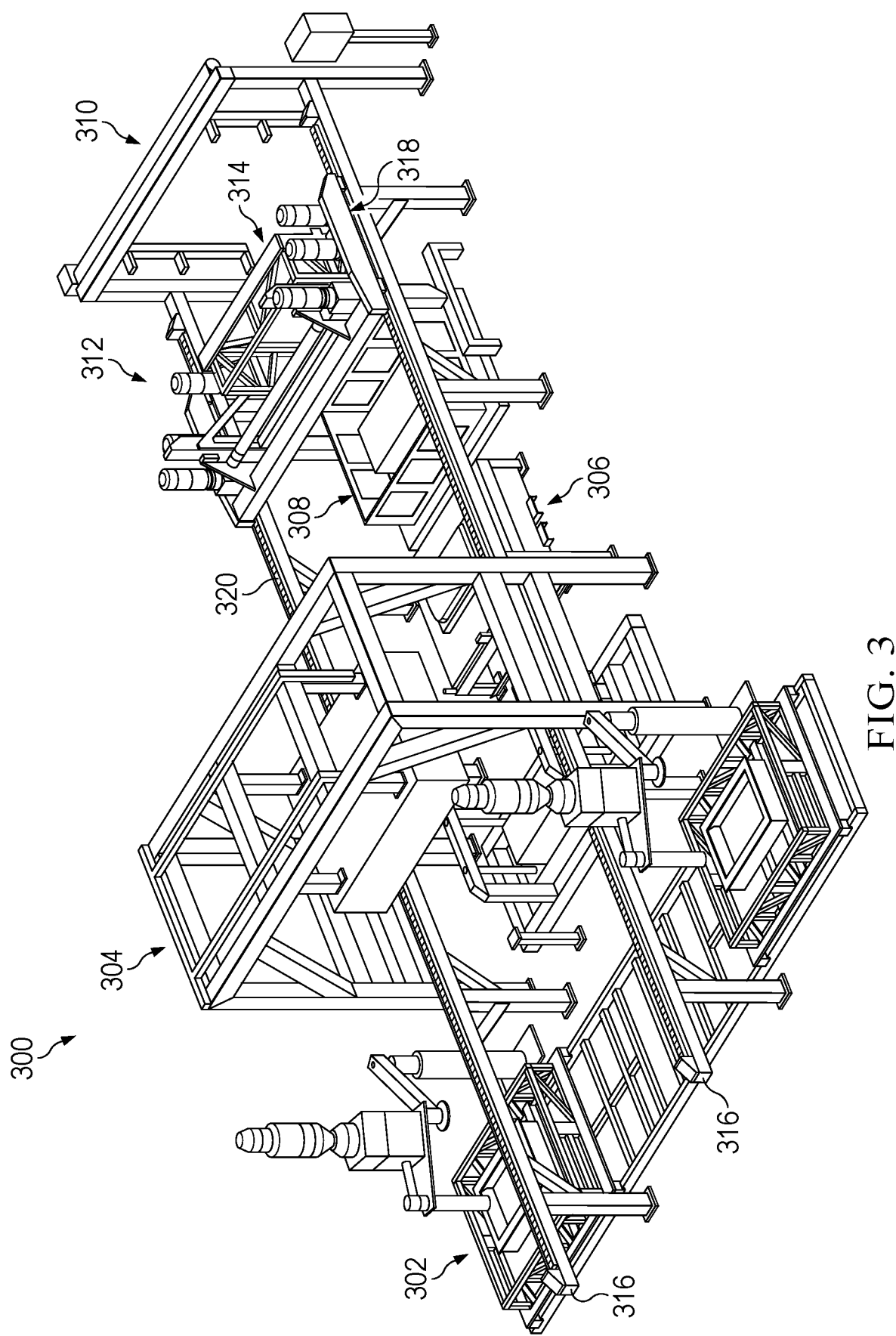
FIG. 3 is an isometric view of an exemplary dual cast slush molding system in accordance with the present invention.
Figure 4:
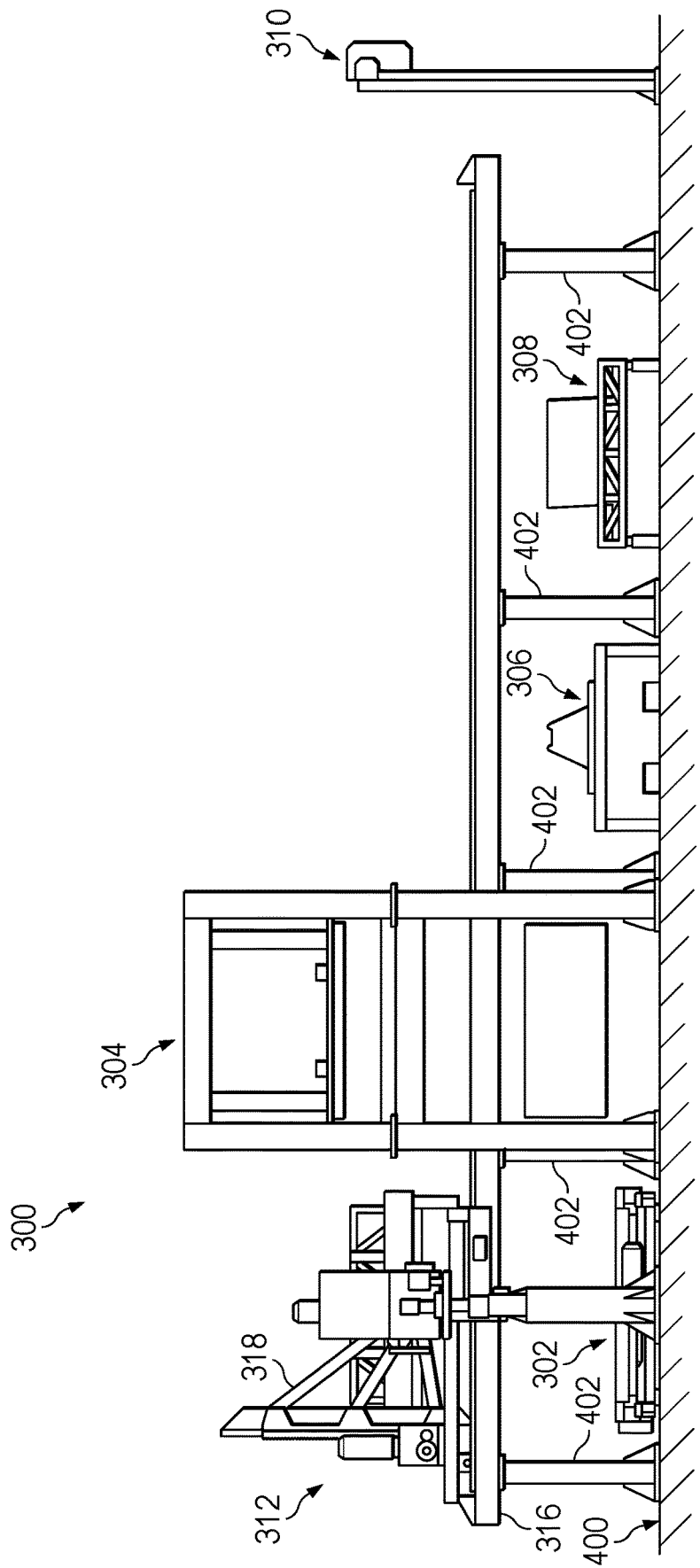
FIG. 4 is a side view of the dual cast slush molding system of FIG. 3.

As shown in FIGS. 3 and 4, a dual cast slush mold system 300 has a number of separate stations, including a powder station 302, a heating station 304, a calibration station 306, a cooling station 308, a demold station 310, and a mold transfer system 312. The mold transfer system 312 is configured to move a mold assembly 314 to and from the various stations of the dual cast slush mold system 300.

The demold station 310 is located at a first end of the dual cast slush mold system 300 and the powder station 302 is located at a second end of the dual cast slush mold system 300. The heating station 304, calibration station 306, and the cooling station 308 are located between the powder station 302 and the demold station 310. For example: (i) the heating station 304 is located next to the powder station 302, between the powder station and the demold station 310; (ii) the calibration station 306 is located next to the heating station 304, between the heating station 304 and the demold station 310; and (iii) the cooling station 308 is located next to the calibration station 306, between the calibration station 306 and the demold station 310. With specific reference to FIG. 4, moving left to right are the: (i) powder station 302; (ii) the heating station 304; (iii) the calibration station 306; (iv) the cooling station 308; and (v) the demold station 310. As shown in FIG. 3, the powder station 302 is oriented perpendicular to the mold transfer system 312. Although not shown, the dual cast slush mold system 300 may include other components such as safety fences, power supplies, control cabinets, etc.

Mold Transfer System

The exemplary mold transfer system 312 is a linear transfer system configured to move the mold assembly 314 to the various stations of the system 300. The mold transfer system 312 includes a pair of linear transfer rails 316 separated by a horizontal distance, and a shuttle 318. In some embodiments, one or both of the linear transfer rails 316 includes a rack 320 extending at least partially the length of the linear transfer rails 316. The shuttle 318 is configured to travel on the linear transfer rails 316. The rails 316 are raised above the facility floor 400 by one or more supporting posts 402.

Mold Assembly

Figure 5:
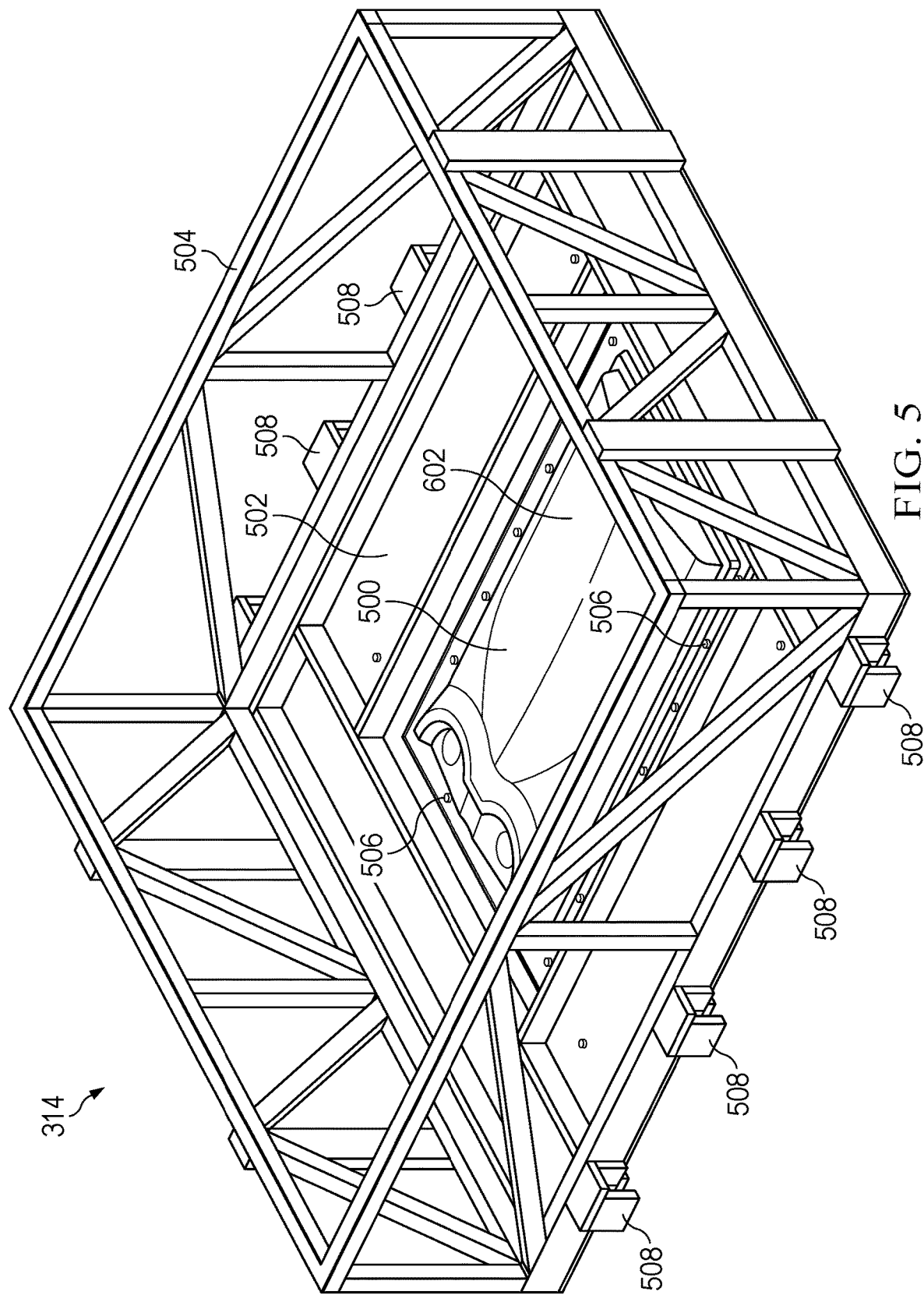
FIG. 5 is an isometric view of a first side of an exemplary mold assembly in accordance with the present invention.
Figure 6:
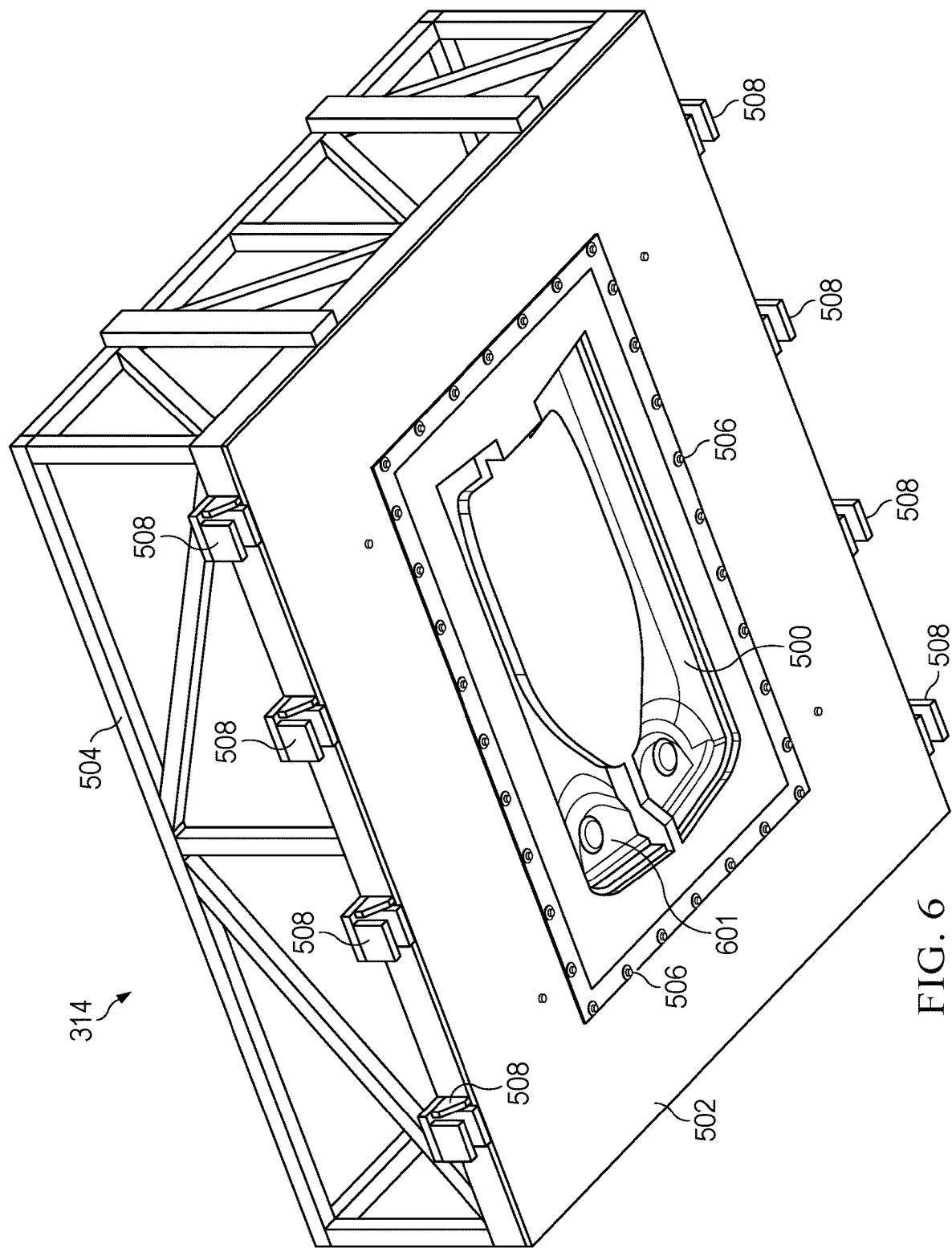
FIG. 6 is an isometric view of a second side of an exemplary mold assembly in accordance with the present invention.

As shown in FIGS. 5 and 6, the exemplary mold assembly 314 includes one or more nickel shells, or molds 500, a plate 502, and a mold frame 504. The mold 500 is typically a 3-4 mm thick nickel mold, which includes a negative side (also known as a first side) 601 and a positive side (also known as a second side) 602. The negative side 601 of the mold 500 has a shape corresponding to the design of the part 100 to be molded and includes any Class A surface details of the particular part 100 to be produced. The part 100 is to be molded on the negative side 601 of the mold 500.

The one or more molds 500 are coupled to the plate 502 by, for example, one or more bolts 506. The plate 502 includes one or more holes that correspond to a perimeter shape of the mold 500 such that the mold 500 can be received at least partially in the hole of the plate 502. The plate 502 is coupled to the mold frame 504, for example, by bolts or screws. Depending on the size, shape, and/or type of part 100 being molded, the mold frame 504 may carry only one mold 500 or multiple molds 500. Additionally, different molds 500 and plates 502 may be coupled to the mold frame 504 in order to mold different parts 100.

The exemplary mold frame 504 further includes one or more clamps 508 along the one or more sides of the mold frame 504. For example, four clamps 508 are on a first side of the mold frame 504 and four clamps 508 are on a second side of the mold frame 504. The clamps 508 are configured to cooperate with other components of the system 300 to couple the mold frame 504 to such components, as described further herein.

Shuttle

Figure 7:
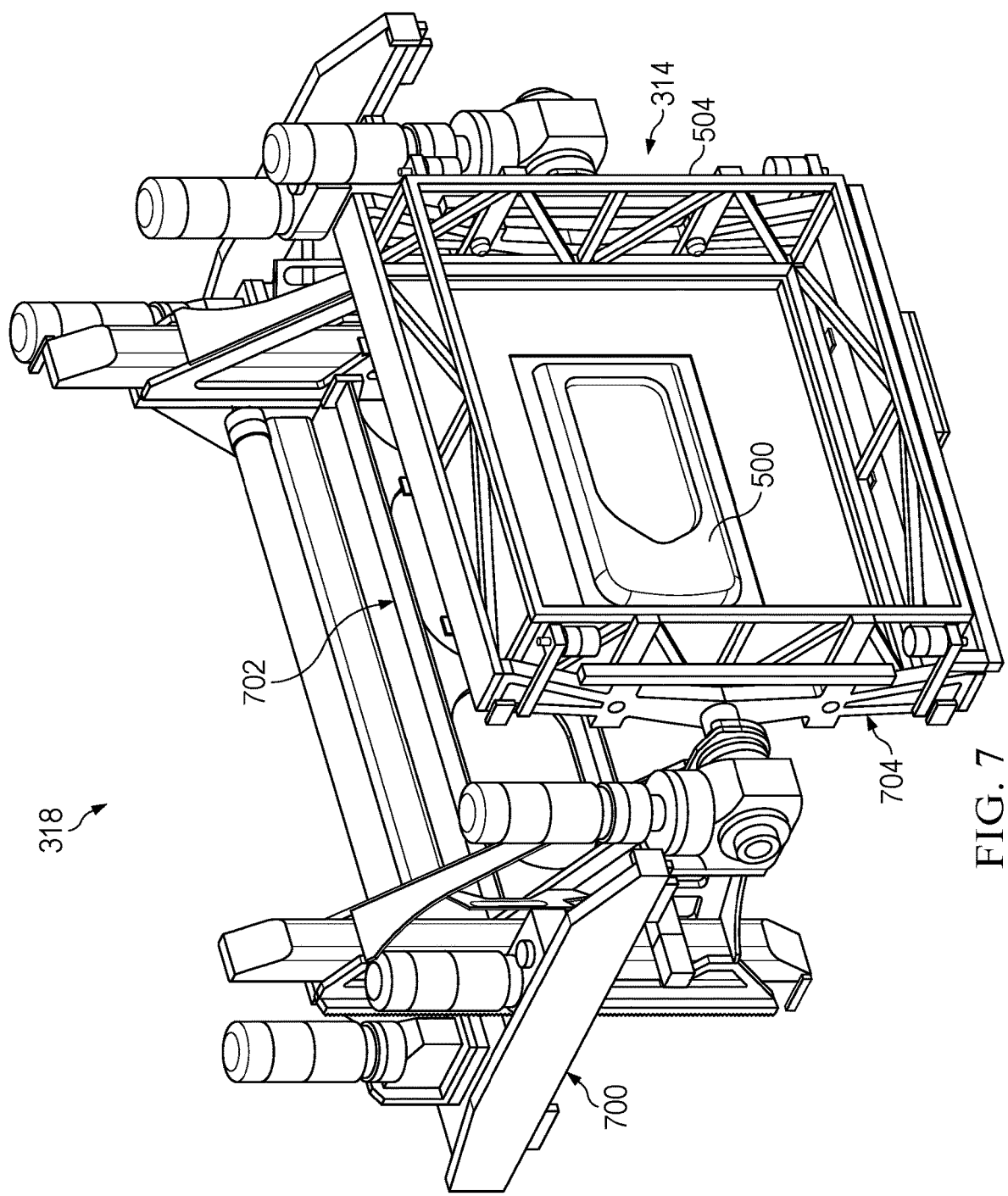
FIG. 7 is an isometric view of an exemplary shuttle in accordance with the present invention.
Figure 8:
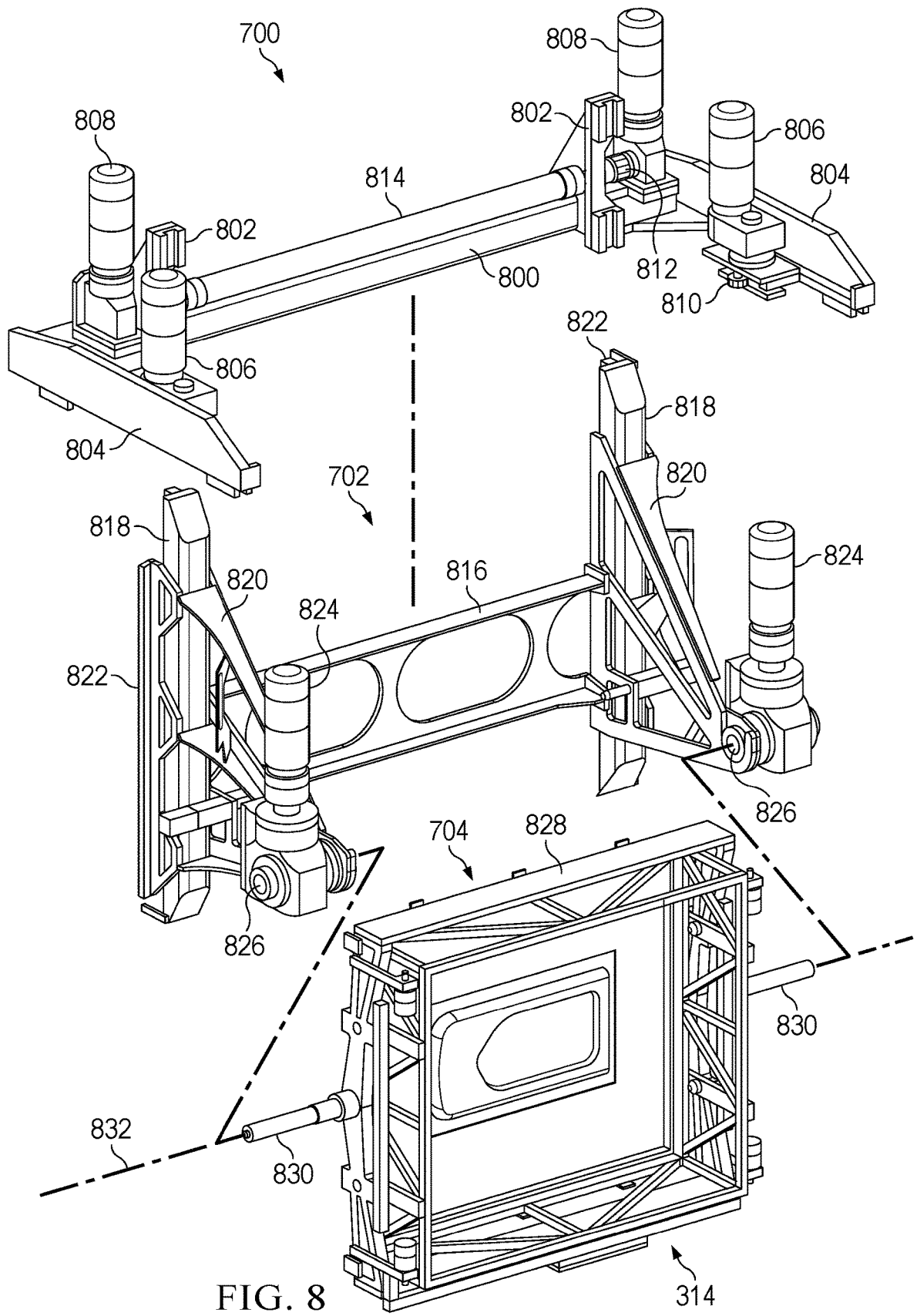
FIG. 8 is an exploded view of the shuttle of FIG. 7.

As shown in FIGS. 7 and 8, the exemplary shuttle 318 includes a horizontal motion frame 700, a vertical motion frame 702, and a rotational motion frame 704. The rotational motion frame 704 is configured to be movably coupled with the vertical motion frame 702, and the vertical motion frame 702 is configured to be movably coupled with the horizontal motion frame 700.

The horizontal motion frame 700 is configured to move the mold assembly 314 and the mold 500 therein, along the linear transfer rails 316. The vertical motion frame 702 is configured to move vertically with respect to the horizontal motion frame 700 to raise and lower the mold assembly 314 and the mold 500 therein. The rotational motion frame 704 is configured to couple with and rotate the mold assembly 314 and the mold 500 therein with respect to the vertical motion frame 702. These motions are carried out during different steps of the dual cast process.

The horizontal motion frame 700 includes a first cross-member 800, a first pair of arms 802, and a second pair of arms 804. A first arm 802 of the first pair of arms 802 is coupled to and extends vertically from a first end of the first cross-member 800 and a second arm 802 of the first pair of arms 802 is coupled to and extends vertically from a second end of the first cross-member 800. A first arm 804 of the second pair of arms 804 is coupled to and extends horizontally from the first arm 802 of the first pair of arms 802 and a second arm 804 of the second pair of arms 804 is coupled to and extends horizontally from the second arm 802 of the first pair of arms 802. The second pair of arms 804 are disposed on the outer side of the horizontal motion frame 700 with the first pair of arms 802 located between the second pair of arms 804. The second pair of arms 804 are spaced apart a sufficient distance to accept the vertical motion frame 702 therebetween. Additionally, the second pair of arms 804 are configured to be disposed over and ride along the pair of linear transfer rails 316. The first pair of arms 802 may be referred to as vertical arms and the second pair of arms 804 may be referred to as horizontal arms.

The horizontal motion frame 700 further includes a first pair of motors 806, a first pair of gears 810, with one gear 810 coupled to each motor 806, a second pair of motors 808, and a second pair of gears 812, with one gear 812 coupled to each motor 808. In some embodiments, the horizontal motion frame includes a first shaft 814 coupled to and extending between the first pair of gears 810, wherein the first shaft 814 is configured to be driven by the first pair of motors 806. The first pair of gears 810 are configured to cooperate with the pair of racks 320 on the linear transfer rails 316. The first pair of motors 806 are configured to rotate the first pair of gears 810 to move the horizontal motion frame 700 along the linear transfer rails 316. In some embodiments, the horizontal motion frame 700 may further include additional cross-members to provide additional structural rigidity to the horizontal motion frame 700.

The vertical motion frame 702 includes a first cross-member 816, a first pair of arms 818, a pair of side frame members 820, a pair of racks 822, and a pair of motors 824. A first arm 818 of the first pair of arms 818 is coupled to and extends vertically from a first end of the first cross-member 816 and a second arm 818 of the first pair of arms 818 is coupled to and extends vertically from a second end of the first cross-member 816. A first rack 822 and a second rack 822 of the pair of racks 822 are coupled to the first arm 818 and the second arm 818 of the pair of arms 818, respectively. A first side frame member 820 and a second side frame member 820 of the pair of side frame members 820 are coupled to the first arm 818 and the second arm 818 of the pair of arms 818, respectively. The pair of side frame members 820 are spaced apart a sufficient distance to accept the rotational motion frame 704 therebetween. A first motor 824 and a second motor 824 of the pair of motors 824 are coupled to the first side frame member 820 and the second side frame member 820 of the pair of side frame members 820, respectively. Each motor 824 further includes a hole 826 configured to receive a portion of the rotational motion frame 704 as further described herein.

The second pair of gears 812 on the horizontal motion frame 700 are configured to cooperate with the pair of racks 822 on the vertical motion frame 702. The second pair of motors 808 are configured to rotate the second pair of gears 812 to move the vertical motion frame 702 up and down along the first pair of arms 802 of the horizontal motion frame 700. Moving the vertical motion frame 702 up and down along the first pair of arms 802 of the horizontal motion frame 700 will cause the mold assembly 314 up and down.

The exemplary rotational motion frame 704 includes a frame 828 and a pair of stub axles 830. A first stub axle 830 and a second stub axle 830 of the pair of stub axles 830 extend away from a first side and a second side of the frame 828, respectively. The pair of stub axles 830 are coaxial with one another about a rotation axis 832. The frame 828 is configured to receive and be removably coupled to the mold assembly 314.

The rotational motion frame 704 is configured to be received between the pair of side frame members 820 of the vertical motion frame 702. Specifically, the pair of stub axles 830 are configured to extend through the pair of holes 826 of the pair of motors 824. The pair of motors 824 on the vertical motion frame 702 are configured to rotate the pair of stub axles 830 to cause rotation of the rotational motion frame 704 and the mold assembly 314 coupled thereto about the rotation axis 832. The pair of motors 824 are configured to rotate the rotational motion frame 704 and the mold assembly 314 coupled thereto in a range of about 30 rpm to about 100 rpm. Preferably, the pair of motors 824 are configured to rotate the rotational motion frame 704 and the mold assembly 314 coupled thereto in a range of about 30 rpm to about 60 rpm. More preferably, the pair of motors 824 are configured to rotate the rotational motion frame 704 and the mold assembly 314 coupled thereto at about 50 rpm.

Although described as a linear transfer system, the mold transfer system 312 may have other configurations. For example, in some embodiments, the rails 316 may be curved and the shuttle 318 may move the mold 500 in an arc between the various stations of the system 300.

Powder Station

Figure 9:
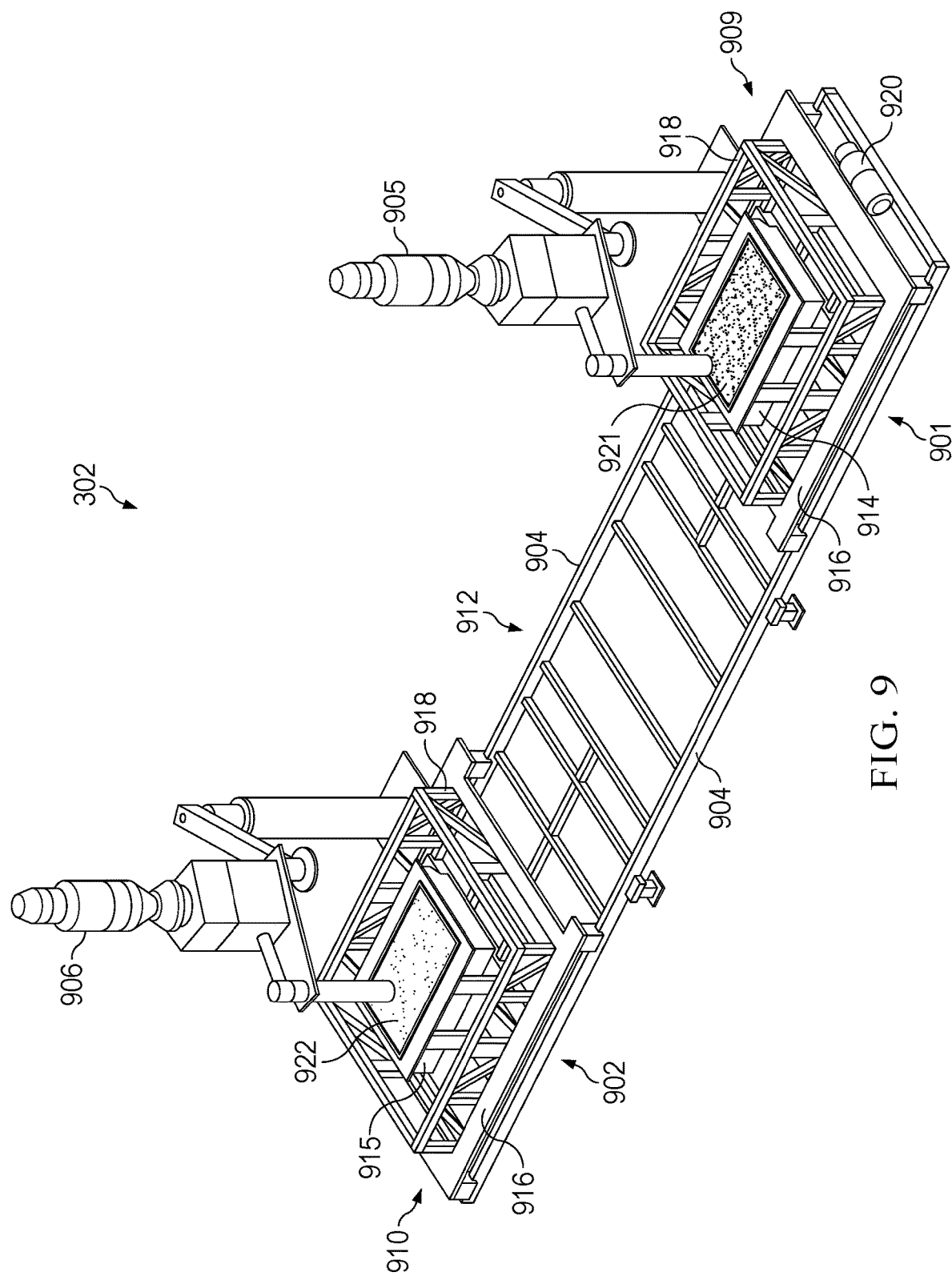
FIG. 9 is an isometric view of an exemplary powder station in accordance with the present invention.
Figure 10:
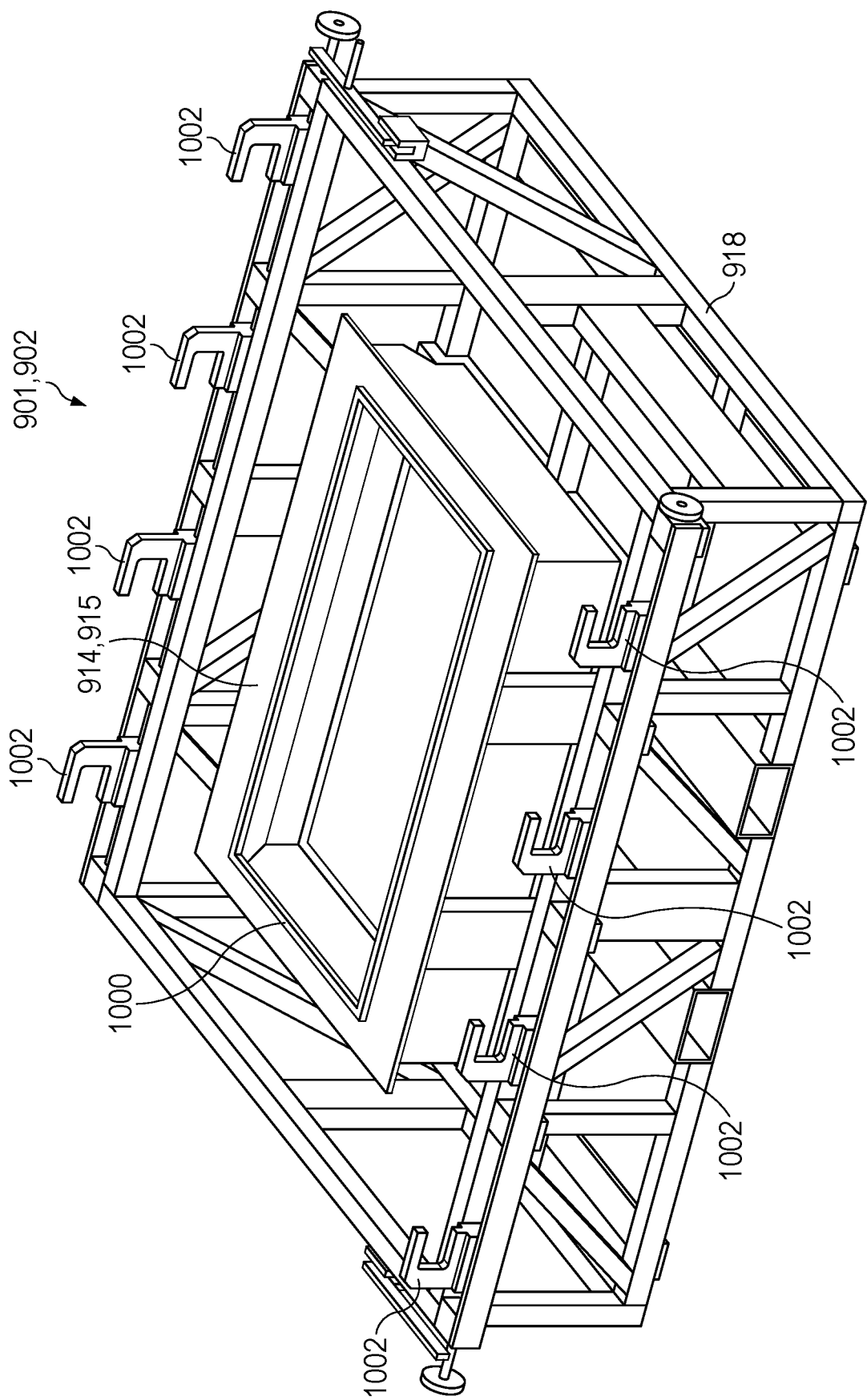
FIG. 10 is an isometric view of an exemplary powder box assembly in accordance with the present invention.

As shown in FIGS. 9 and 10, the powder station 302 includes a first powder box assembly 901, a second powder box assembly 902, a pair of rails 904, a first powder refill unit 905, and second powder refill unit 906. The first and second powder box assemblies 901, 902 are configured to travel independently along the pair of rails 904. The powder station 302 includes a first staging area 909, a second staging area 910, and a casting area 912. The first powder box assembly 901 is configured to move from the first staging area 909 to the casting area 912, and the second powder box assembly 902 is configured to move from the second staging area 910 to the casting area 912.

The first and second powder box assemblies 901, 902 include a first powder box 914 and a second powder box 915, respectively, a powder shuttle 916, and a powder box frame 918. Each exemplary first and second powder box assembly 901, 902 further includes one or more motors 920 for moving the first and second respective powder box assembly 901, 902 along the pair of rails 904.

The first and second powder boxes 914, 915 are coupled to their respective powder box frames 918. The first and second powder boxes 914, 915 and their respective powder box frames 918 are configured to be carried by, removed from, and replaced onto their respective powder shuttles 916 during different steps of the dual cast process. The first powder box 914 is configured to hold a first polymeric powder 921. The second powder box 915 is configured to hold a second polymeric powder 922. Additionally, each of the first powder box 914 and the second powder box 915 includes a seal 1000 configured to be pressed against the mold 500 during certain steps of the dual cast process. The powder boxes 914, 915, seal 1000, and mold 500 cooperate to form a sealed chamber in which the part 100 is formed. In some embodiments, each of the first and second powder box assembly 901, 902 may include more than one powder box (e.g., two powder boxes per powder box assembly, three powder boxes per powder box assembly). In some embodiments, the number of powder boxes in each powder box assembly corresponds to the number of molds 500 carried by the mold assembly 314. Additionally, in some embodiments, the first and second powder box assemblies 901, 902 may include one or more chimneys having a top edge that corresponds to the shape of the mold 500.

As shown in FIG. 10, each powder box frame 918 further includes one or more hooks 1002 along the one or more sides of the powder box frame 918. For example, four hooks 1002 are on a first side of the powder box frame 918 and four hooks 1002 are on a second side of the powder box frame 918. The hooks 1002 on the powder box frame 918 are configured to be received by the clamps 508 on the mold frame 504 to couple the mold 500 to each respective powder box 914, 915, as described further herein.

First Heater—Infrared Heater

Figure 11:
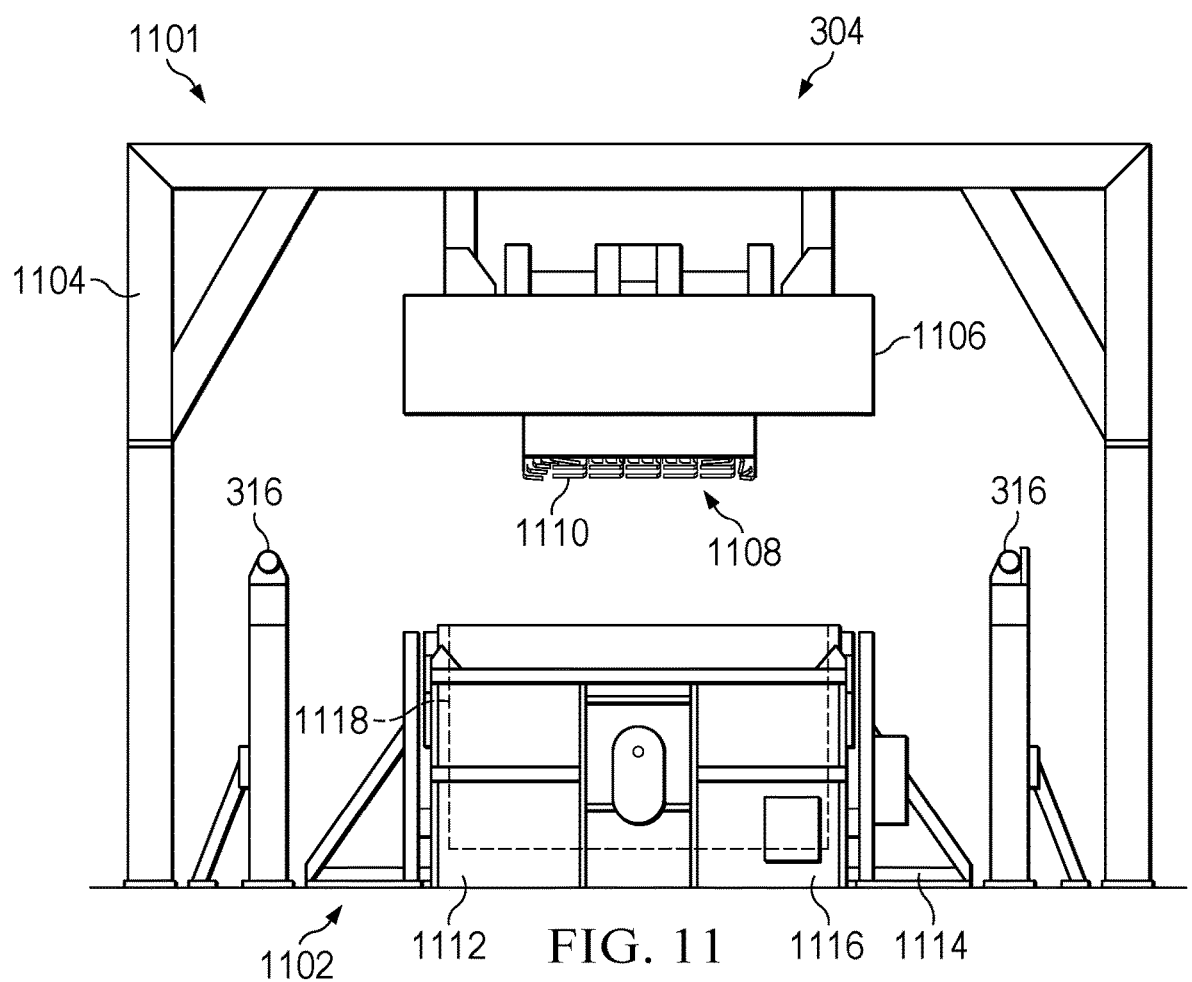
FIG. 11 is a front view of an exemplary heating station in accordance with the present invention.
Figure 12:
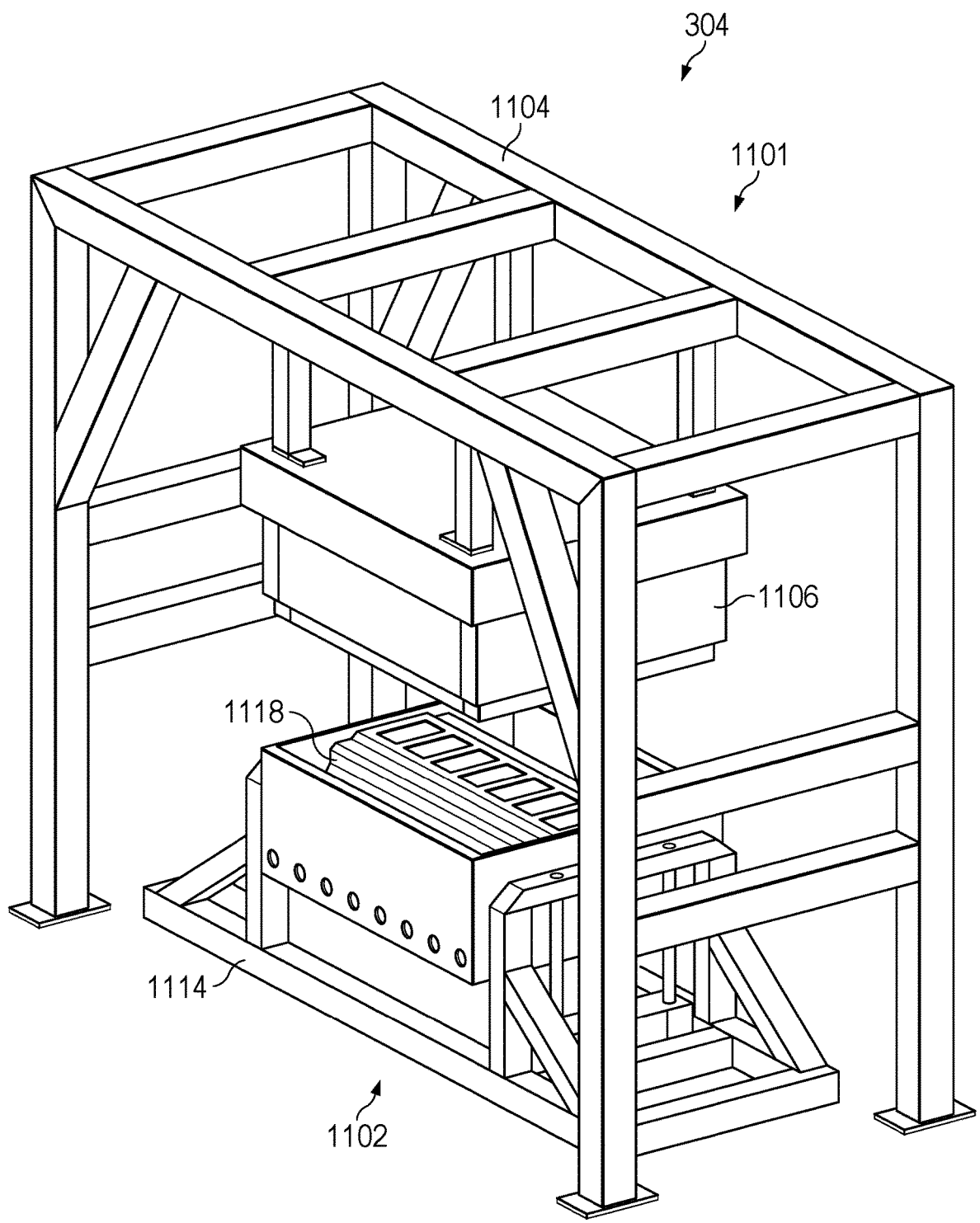
FIG. 12 is an isometric view of the heating station of FIG. 11.

As shown in FIGS. 11 and 12, the exemplary heating station 304 includes a first heater 1101 and a second heater 1102. The first heater 1101 is located above the second heater 1102. The second heater 1102 moves with respect to the first heater 1101 during operation of the system 300.

The first heater 1101 includes a frame 1104, a cover hood 1106 coupled to the frame 1104, and an array of heating elements 1108 coupled to the frame 1104 (see FIG. 11). The first heater 1101 is located above the rails 316 of the mold transfer system 312 (see FIGS. 3 and 4). The exemplary first heater 1101 is preferably an infrared (IR) heater, wherein the array of heating elements 1108 includes one or more infrared emitters 1110. The exemplary first heater 1101 includes an array of about 50 to about 300 infrared emitters 1110. Preferably, the first heater 1101 includes an array of about 250 infrared emitters 1110. In some embodiments, the first heater 1101 includes no more than 250 infrared emitters 1110. The array of heating elements 1108 includes about 50 to 300 individually-controlled heating zones. Preferably, the array of heating elements 1108 includes about 150 individually-controlled heating zones. In some embodiments, each heating element of the array of heating elements 1108 are individually controlled, such that the number of individually-controlled heating zones is equal to the number of heating elements (e.g., infrared emitters 1110).

In some embodiments, the array of heating elements 1108 may be lowered from the cover hood 1106 for maintenance of one or more heating elements 1108. Additionally, the array of heating elements 1108 may be removed from the frame 1104 and a different array of heating elements 1108 may be installed in the system 300 for the production of a different part.

Second Heater—Convention Heater

The second heater 1102 includes a convection heater 1112 and a lift 1114 configured to raise and lower the convection heater 1112 during various steps of the dual cast process. In some embodiments, the lift 1114 is a scissor lift. In some embodiments, the lift 1114 is a linear vertical lift. The convection heater 1112 includes an outer box 1116 and an inner box 1118. As shown in FIG. 11, the inner box 1118 (shown in dashed lines) is located within the outer box 1116. The outer box 1116 is not shown in FIG. 12.

Figure 13:
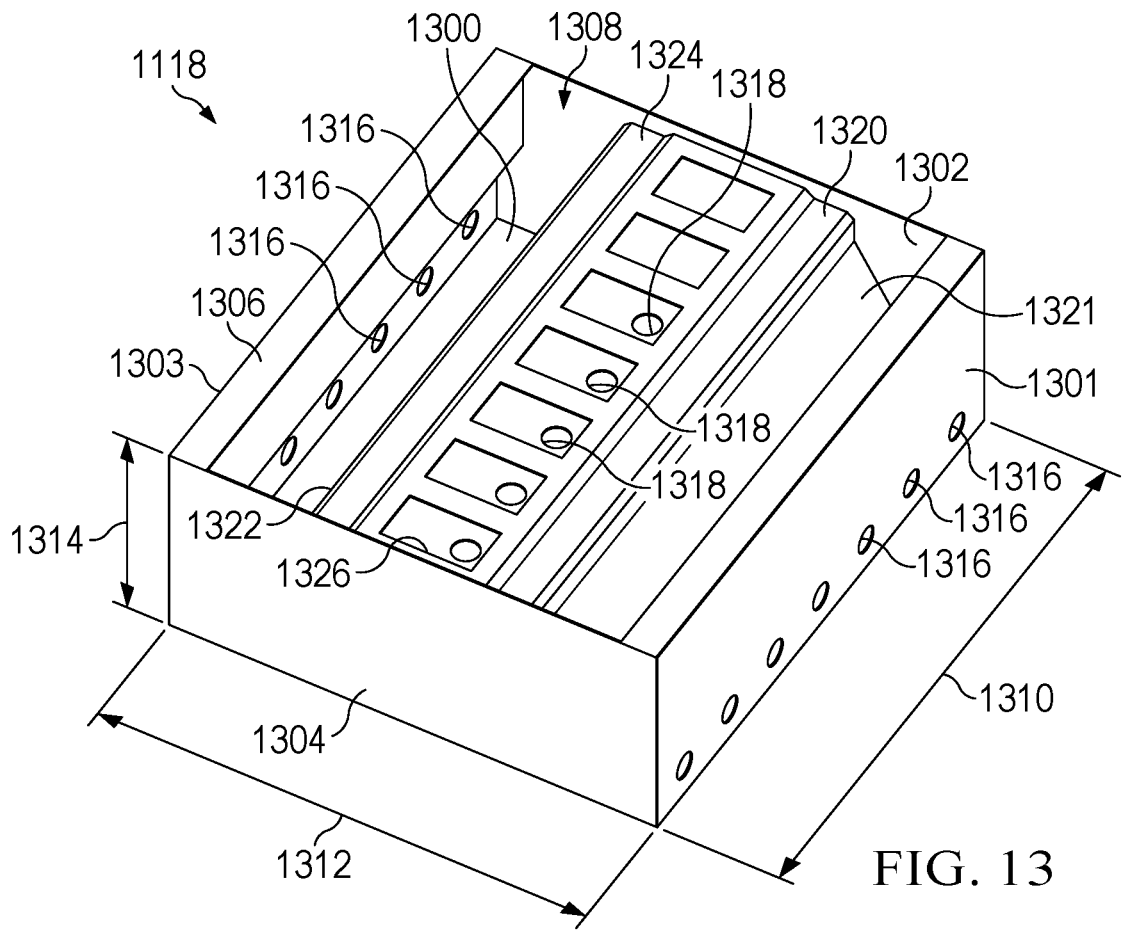
FIG. 13 is an isometric view of an exemplary inner box of a convection heater in accordance with the present invention.
Figure 14:
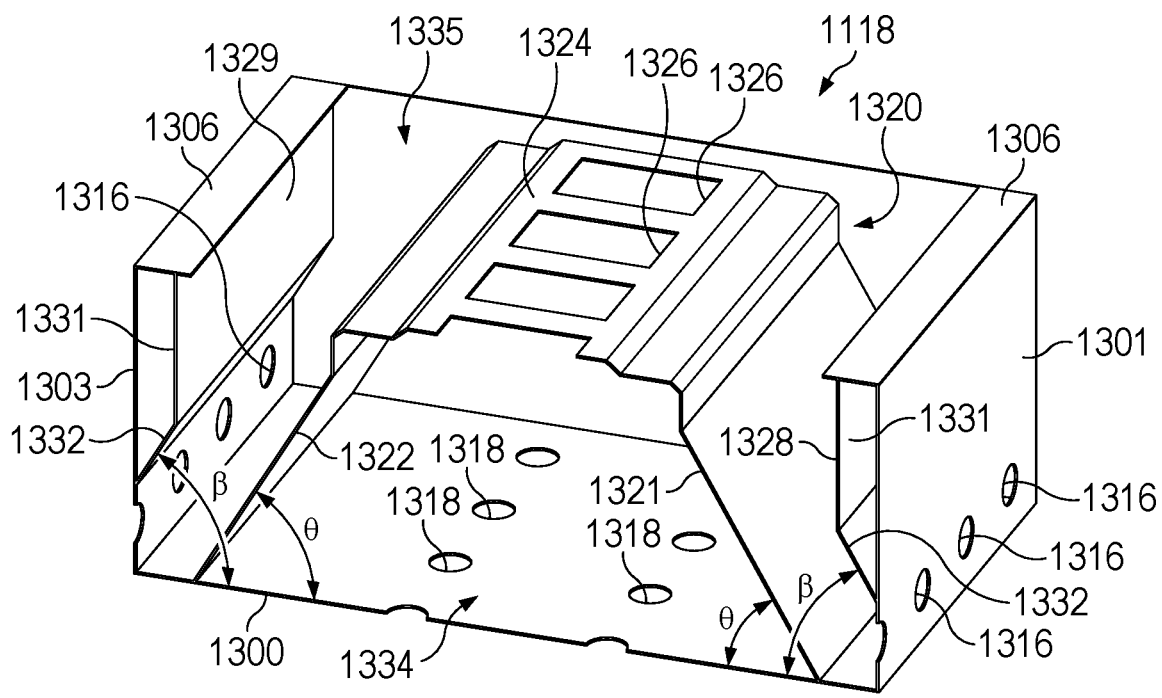
FIG. 14 is an isometric section view of the inner box of FIG. 13.

Referring now to FIGS. 13 and 14 additional details of the exemplary inner box 1118 are shown. The inner box 1118 includes a bottom wall 1300, a first wall 1301, a second wall 1302, a third wall 1303, a fourth wall 1304, a top 1306, and an opening 1308. Each of the four walls extend upward from the bottom wall 1300. The inner box 1118 has a length 1310, width 1312, and height 1314. In some embodiments, the length 1310 is greater than the width 1312.

The first wall 1301 and the third wall 1303 include a plurality of holes 1316 extending along the length of the inner box 1118 proximate to the bottom wall 1300. For example, the first wall 1301 and the third wall 1303 each include seven holes 1316. In other embodiments, each of the first wall 1201 and the third wall 1303 include less than seven holes 1316. In some embodiments, each of the first wall 1201 and the third wall 1303 include more than seven holes 1316.

The bottom wall 1300 includes a plurality of holes 1318 extending along the length of the inner box 1118. As shown in FIG. 14, the plurality of holes 1318 in the bottom wall 1300 are arranged in two rows. For example, the bottom wall 1300 includes two rows of seven holes 1318, for a total of fourteen holes 1318. In some embodiments, the bottom wall 1300 includes more than fourteen holes 1318. In some embodiments, the bottom wall 1300 includes less than fourteen holes 1318. In some embodiments, the bottom wall 1300 includes more than two rows of holes 1318. In some embodiments, the bottom wall 1300 includes less than two rows of holes 1318. The holes 1316 in the first wall 1301, the second wall 1302, and the bottom wall 1300 are preferably circular.

Within the inner box 1118 is a baffle 1320 having a first baffle wall 1321 extending upward from the bottom wall 1300, a second baffle wall 1322 extending upward from the bottom wall 1300, and a top baffle wall 1324 extending from the first baffle wall 1321 to the second baffle wall 1322. The first baffle wall 1321, the second baffle wall 1322, and the top baffle wall 1324 extend along the length of the inner box 1118 perpendicular to the second wall 1302 and the fourth wall 1304. The top baffle wall 1324 includes a plurality of holes 1326 extending along the length of the inner box 1118. The holes 1326 in the top baffle wall 1324 are preferably rectangular. The top baffle wall 1324 has a height less than the height 1314 of the inner box 1118.

The first baffle wall 1321 and the second baffle wall 1322 are oriented at an angle $\theta$ with respect to the bottom wall 1300. The angle $\theta$ ranges from about 30 degrees to about 90 degrees. Preferably, the angle $\theta$ is from about 45 degrees to about 80 degrees. Most preferably, the angle $\theta$ is about 60 degrees.

The exemplary inner box 1118 includes a first outer baffle 1328 on the first wall 1301 extending the length of the inner box 1118 and a second outer baffle 1329 on the third wall 1303 extending the length of the inner box 1118. Each of the first outer baffle 1328 and the second outer baffle 1329 extend downward from the top 1306 and along the first wall 1301 and the third wall 1303, respectively, of the inner box 1118 and terminate above the plurality of holes 1316 in the first wall 1301 and the third wall 1303.

Each of the first outer baffle 1328 and the second outer baffle 1329 includes a first outer baffle wall 1331 and a second outer baffle wall 1332 coupled to the first outer baffle wall 1331. The second outer baffle walls 1332 are oriented at an angle $\beta$ with respect to the bottom wall 1300. The angle $\beta$ ranges from about 30 degrees to about 90 degrees. Preferably, the angle $\beta$ is from about 45 degrees to about 80 degrees. Most preferably, the angle $\beta$ is about 60 degrees. Preferably, the angle $\beta$ is equal to the angle $\theta$. In some embodiments, the angle $\beta$ is not equal to the angle $\theta$.

The baffle 1320 separates the inner box 1118 into a first chamber 1334 and a second chamber 1335. The first chamber 1334 and the second chamber 1335 are fluidly coupled through the plurality of holes 1326 in the top baffle wall 1324.

Figure 15:
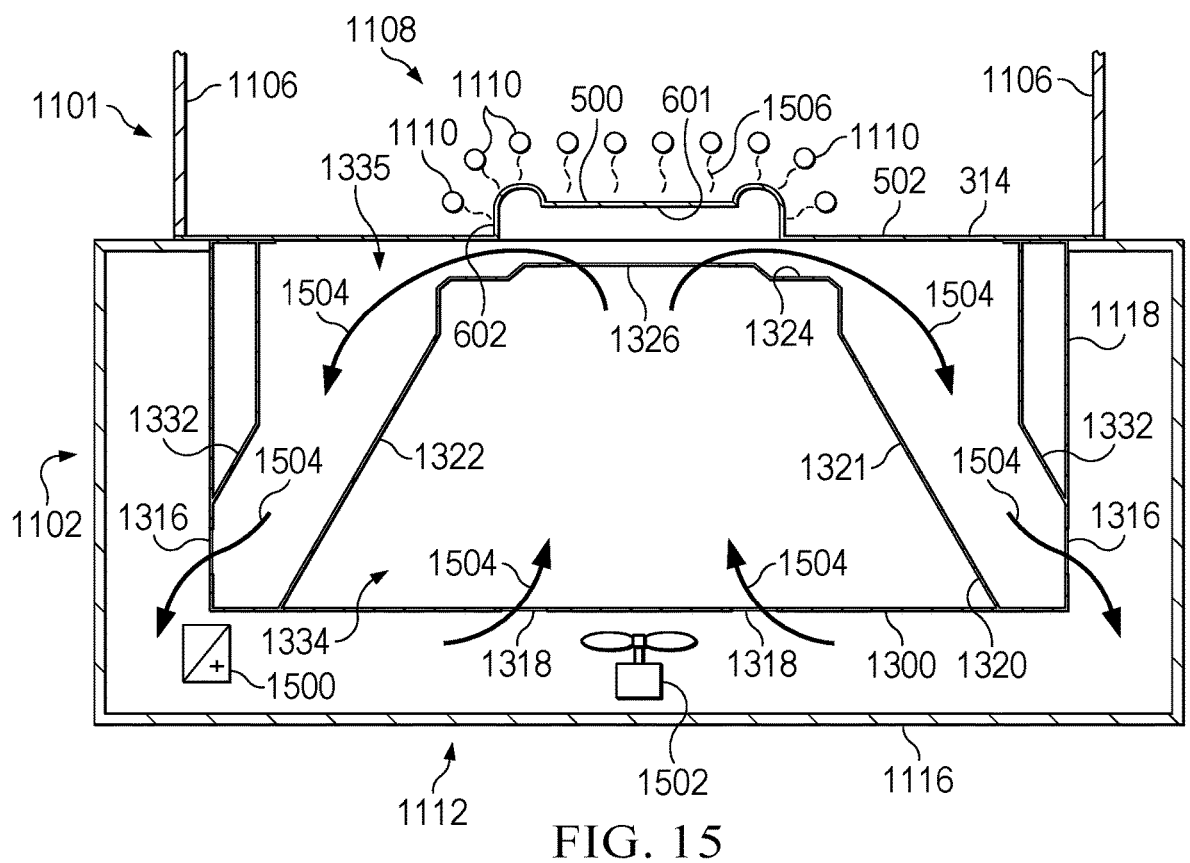
FIG. 15 is a section view of an exemplary heating station in accordance with the present invention.

With respect to FIG. 15 additional details of the first heater 1101 and the second heater 1102 are shown. The convection heater 1112 includes one or more sources of heat configured to heat air, such as for example, heater 1500, and one or more air movers, such as for example, fan 1502. In some embodiments, the heater 1500 is a gas heater or an electric heater. The one or more heaters 1500 and the one or more fans 1502 are located in the outer box 1116. However, in some embodiments, the one or more heaters 1500 may be located outside of outer box 116 and may supply heated air via a duct to the outer box 1116. In some embodiments, the one or more fans 1502 may be located outside the outer box 1116 and may blow heated air into the outer box 1116.

During various steps of the dual cast process, the mold assembly 314 is placed into contact with the top the inner box 1118 such that the mold 500 and the plate 502 seal against the inner box 1118 to close the top of the inner box 1118 to prevent airflow out the top of the inner box 1118. Then, during operation of the convection heater 1112, heated air from the outer box 1116, is directed into the first chamber 1334 through the holes 1318 in the bottom wall 1300 of the inner box 1118. The heated air then flows upward within the first chamber 1334 toward the holes 1326 in the top baffle wall 1324. The upward flow of the heated air is assisted by the angled first baffle wall 1321 and the second baffle wall 1322. The heated air then exits the first chamber 1334 and enters the second chamber 1335 through the holes 1326 in the top baffle wall 1324.

After exiting first chamber 1334, the heated air will then come into contact with and cause heating of the negative side 601 of the mold 500, the first polymer layer 201, or the second polymer layer 202, depending on the step of the dual cast process, as described further herein. Additionally, because the height of the top baffle wall 1324 is less than the height of the inner box 1118, a gap is formed between the mold 500 and the mold frame 504 through which the air is able to travel within the second chamber 1335 toward the holes 1316 in the first wall 1301 and the third wall 1303 of the inner box 1118. The first baffle wall 1321, the second baffle wall 1322, the first outer baffle 1328, and the second outer baffle 1329 assist in directing the flow of air toward the holes 1316 in the first wall 1301 and the third wall 1303 of the inner box 1118. In particular, the angle of the first baffle wall 1321, the second baffle wall 1322, and the second outer baffle walls 1332 increase the efficiency of the airflow.

The air then exits the second chamber 1335 and the inner box 1118 and enters the outer box 1116 through the holes 1316 in the first wall 1301 and the third wall 1303. The air is then heated within the outer box 1116 and recirculated through the holes 1318 in the bottom wall 1300 of the inner box 1118.

In this flow path, shown by arrows 1504, the holes 1318 in the bottom wall 1300 may be referred to as inlets, and the holes 1316 in the first wall 1301 and third wall 1303 may be referred to as outlets. The flow path shown by arrows 1504 results in even heating of the heating of the negative side 601 of the mold 500, the first polymer layer 201, or the second polymer layer 202, depending on the step of the dual cast process, as described further herein.

Although the flow path shown by arrows 1504 is preferred, in some embodiments, the flow path may be reversed, such that heated air enters the inner box 1118 through the holes 1316 in the first wall 1301 and third wall 1303 and exits the inner box 1118 through the holes 1318 in the bottom wall 1300. In such embodiments, the holes 1316 in the first wall 1301 and third wall 1303 may be referred to as inlets, and the holes 1318 in the bottom wall 1300 may be referred to as outlets.

Additionally, as shown in FIG. 15, during various steps of the dual cast process, the mold assembly 314 is placed proximate to the first heater 1101 so that the positive side 602 of the mold 500 is located in the desired position with respect to the array of heating elements 1108. During various heating steps, the infrared emitters 1110 that form the array of heating elements 1108 are powered to heat the positive side 602 of the mold 500, shown by arrows 1506.

Calibration Station

Figure 16:
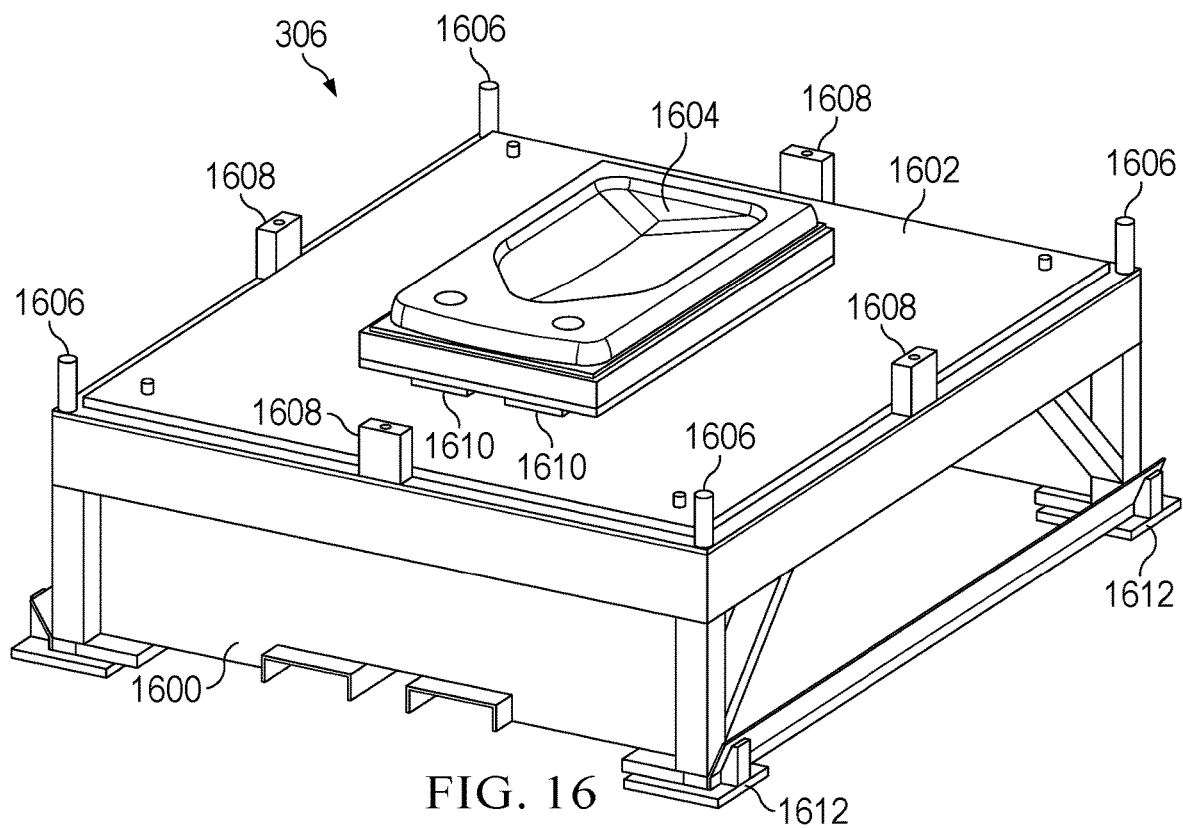
FIG. 16 is an isometric view of an exemplary calibration station in accordance with the present invention.

As shown in FIG. 16, the exemplary calibration station 306 includes a base frame 1600, a base plate 1602 supported by the base frame 1600, and a calibration plug 1604 supported by the base plate 1602. The calibration plug 1604 has a positive shape corresponding to but offset from the negative side 601 of the mold 500. For example, the calibration plug 1604 is preferably offset by 2.5 mm from the size and shape of the mold 500. In some embodiments, the calibration plug is offset by about 2 mm to about 5 mm from the size and shape of the negative side 601 of the mold 500. The calibration plug 1604 is configured to be pressed against the second polymer layer 202 during the dual cast process, as described further herein.

The exemplary calibration station 306 includes one or more locating features configured to locate the mold 500 with respect to the calibration plug 1604. For example, the locating features include one or more centering pins 1606 located at the corners of the base frame 1600. The one or more centering pins 1606 interface with the mold frame 504 to ensure that the mold 500 is in the proper location with respect to the calibration plug 1604, during the dual cast process as described further herein. In some embodiments, the locating features include one or more zero plates 1608, for example, located along the sides of the base frame 1600. The one or more zero plates 1608 interface with the mold frame 504 to ensure that the mold 500 is at the proper distance from the calibration plug 1604, during the dual cast process as described further herein.

In some embodiments, the calibration station 306 may optionally include one or more air cushions 1610 between the base plate 1602 and the calibration plug 1604. When included, the one or more air cushions 1610 may be inflated with adjustable speed and/or air pressure to raise the calibration plug 1604 upward away from the base plate 1602. The one or more air cushions 1610 may be deflated to lower the calibration plug 1604 toward the base plate 1602. In some embodiments, the air cushions 1610 are not included and the calibration plug 1604 is located directly on the base plate 1602.

In some embodiments, calibration station 306 may optionally include one or more floor plates 1612 secured to the floor of the facility. When included, the base frame 1600 may be placed on or in the floor plates 1612 to locate and retain the base frame 1600 in position. In some embodiments, the one or more floor plates 1612 may include locating features, such as for example, centering pins, configured to locate the base frame 1600 with respect to the one or more floor plates 1612. The base frame 1600 may be removably coupled with the floor plates 1612. The ability to remove the base frame 1600 from the floor plates 1612 may make it easier to maintain the calibration station 306 and change out the calibration plug 1604. In some embodiments, the base frame 1600 is fixed to the ground (e.g., the floor of the manufacturing facility).

Cooling Station

Figure 17:
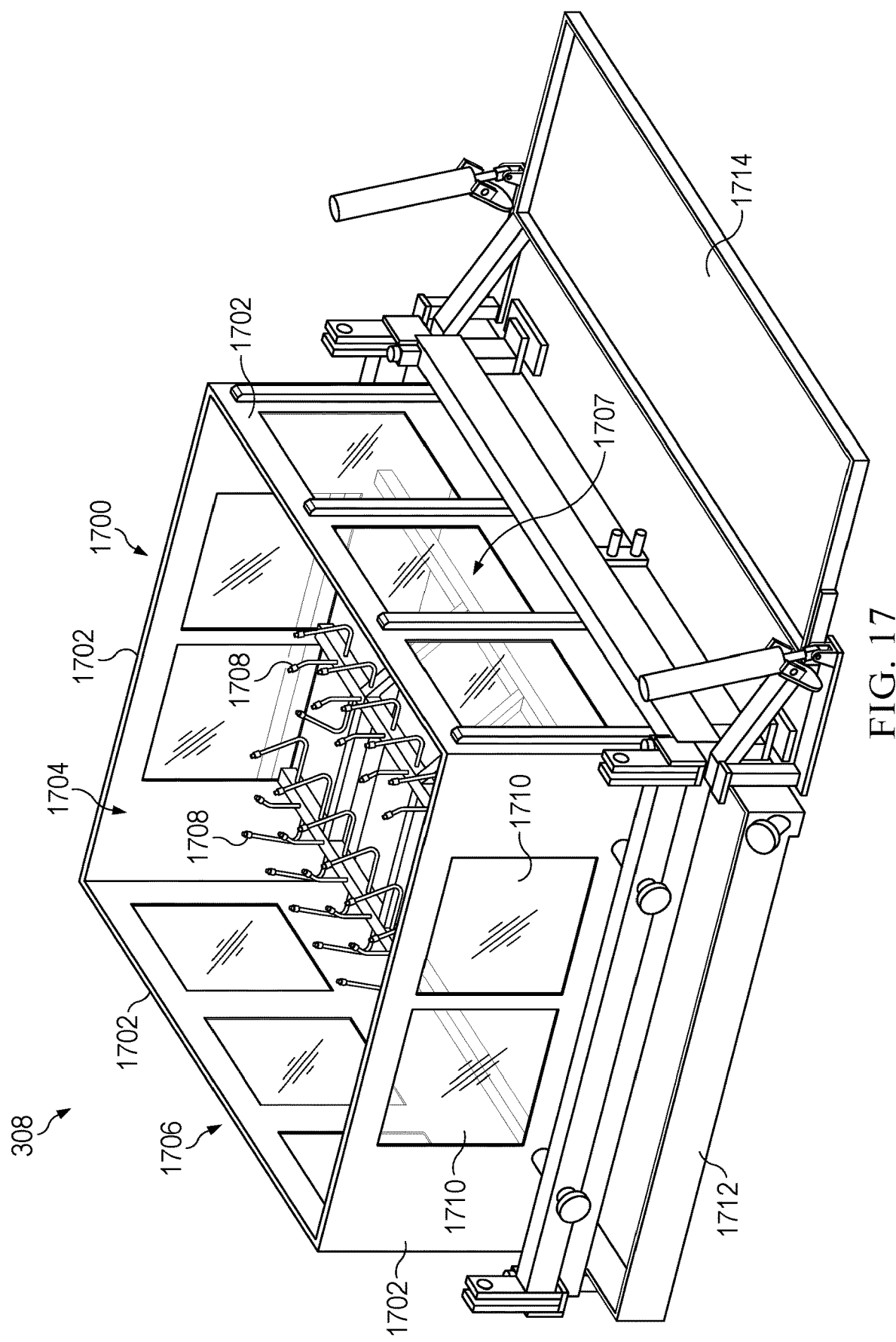
FIG. 17 is an isometric view of an exemplary cooling station in accordance with the present invention.

As shown in FIG. 17, the exemplary cooling station 308 includes a cooling box 1700 having one or more walls 1702 forming a cooling chamber 1704 having an open top 1706 and an open bottom 1707. The cooling station 308 further includes a plurality of spray nozzles 1708 configured to spray a cooling fluid, preferably, water. In some embodiments, the one or more walls 1702 include one or more windows 1710 that permit viewing into the cooling chamber 1704. The cooling station 308 further includes a collection tray 1712 under the cooling box 1700 configured to collect the cooling fluid to be recycled. In some embodiments, a drip tray 1714 is included and is configured to collect cooling fluid that may drip off the mold 500 following a cooling step. The drip tray 1714 is configured to tilt up and pour any cooling fluid in the drip tray into the collection tray 1712.

Demold Station

Figure 18:
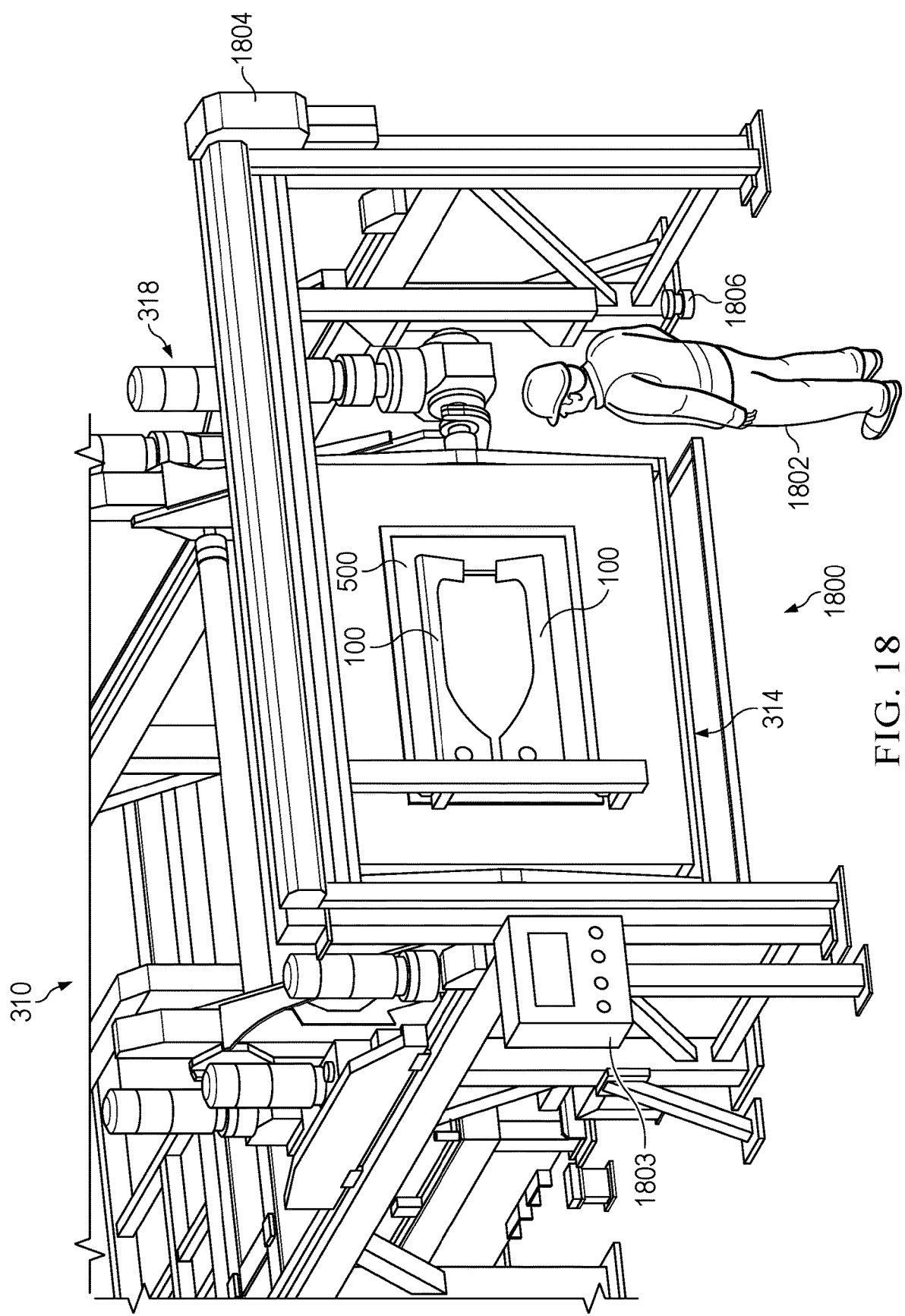
FIG. 18 is an isometric view of an exemplary demold station in accordance with the present invention.

As shown in FIG. 18, the exemplary demold station 310 includes an access point 1800 through which an operator 1802 can access the mold 500 to remove a completed part 100. One or more controllers 1803 configured to control operation of the system 300 may be located proximate to the access point 1800. The demold station 310 further includes one or more operator safety devices, including, for example, a rollup door 1804, a safety scanner 1806, and a light curtain (not shown). Additionally, the mold 500 and/or mold assembly 314 may be changed at the demold station 310.

Process Description

Figure 19:
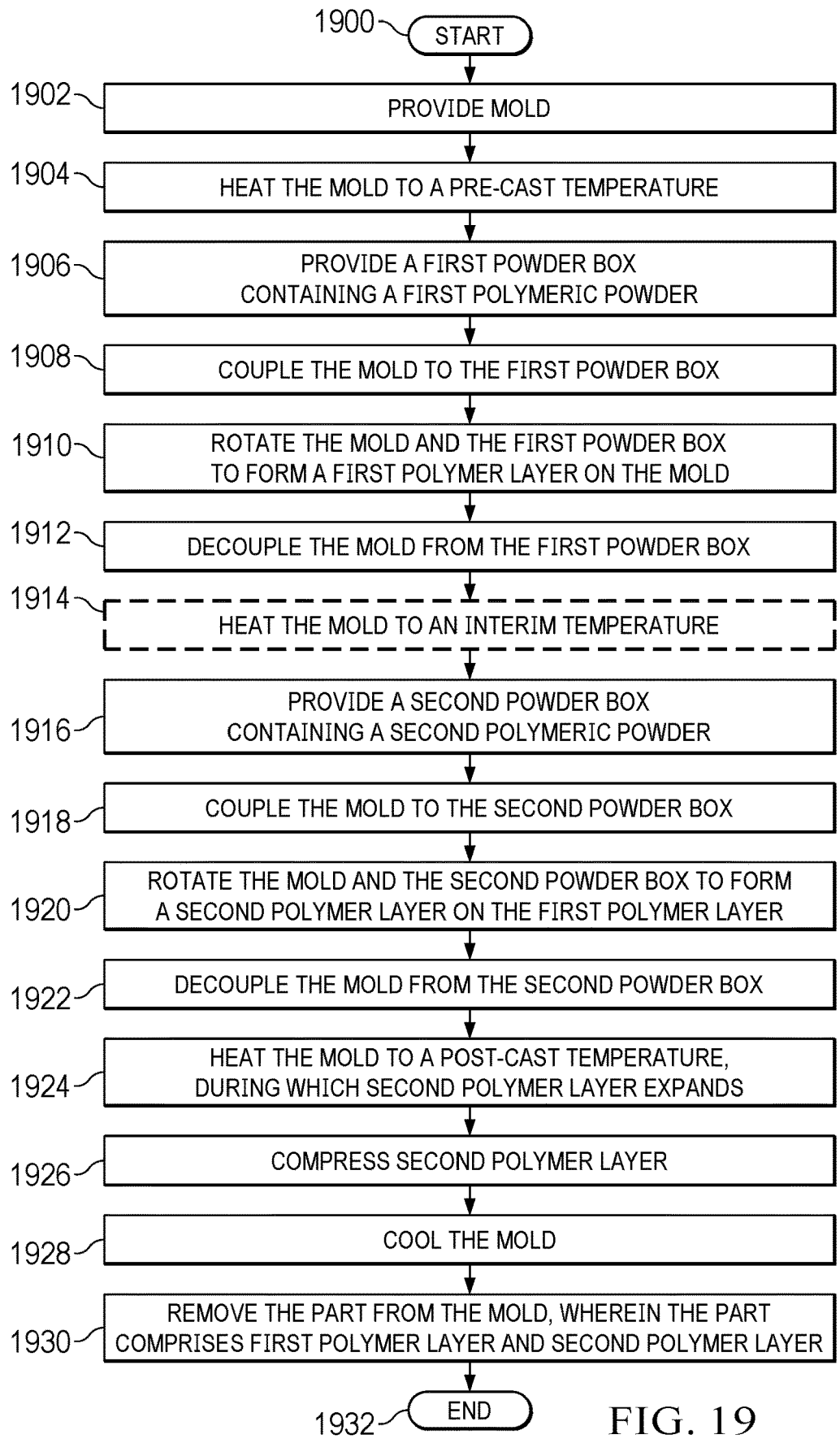
FIG. 19 is a diagrammatic flow chart showing an exemplary method for fabricating a part composed of a dual layer polymeric material in accordance with various aspects of the present invention.

FIG. 19 shows an exemplary process for producing a part using the dual cast slush mold system 300 described herein. At block 1900 the process starts. The process may be manually started by an operator 1802 or it may be automatically started by the controller 1803. At block 1902, the mold 500 is provided, wherein the mold 500 has the negative side 601 and the positive side 602. At block 1904, the mold 500 is heated, in a pre-cast heating step, to a pre-cast temperature.

At block 1906, the first powder box 914 containing the first polymeric powder 921 is provided. At block 1908, the mold 500 is coupled to the first powder box 914. At block 1910, the mold 500 and the first powder box 914 are rotated, in a first rotation step, during which at least a portion of the first polymeric powder 921 melts and forms the first polymer layer 201 on the negative side 601 of the mold 500. At block 1912, the mold 500 is decoupled from the first powder box 914.

At optional block 1914, the mold 500 is heated, in an interim heating step, to an interim temperature. This interim heating step is optional and may only be required if the mold 500 has dropped below the required temperature for the second casting step.

At block 1916, the second powder box 915 containing the second polymeric powder 922 is provided. At block 1918, the mold 500 is coupled to the second powder box 915. At block 1920, the mold 500 and the second powder box 915 are rotated, in a second rotation step, during which at least a portion of the second polymeric powder 922 melts and forms the second polymer layer 202 on the first polymer layer 201. At block 1922, the mold 500 is decoupled from the second powder box 915.

At block 1924, the mold 500 is heated, in a post-cast heating step, to a post-cast temperature, wherein during the post-cast heating step, the second polymer layer 202 expands from a first thickness to a second thickness. At block 1926, the second polymer is compressed to a third thickness. At block 1928, the mold 500 is cooled. At block 1930, the part 100 is removed from the mold. At block 1932 the process ends. The process can be repeated to produce additional parts 100.

The dual cast slush mold system 300 is able to produce a part 100 with a cycle time ranging from about 150 seconds to about 360 seconds. Preferably, the dual cast slush mold system 300 is able to produce a part 100 with a cycle time ranging from about 200 seconds to about 300 seconds. Preferably, the dual cast slush mold system 300 is able to produce a part 100 with a cycle time ranging from about 260 seconds to about 295 seconds. More preferably, the dual cast slush mold system 300 is able to produce a part 100 with a cycle time ranging from about 230 seconds to about 300 seconds.

Providing a Mold

With continued reference to FIG. 19, the step of providing a mold at block 1902 includes coupling the mold 500 to the mold plate 502 and the mold frame 504. The mold assembly 314 containing the mold 500, the mold plate 502 and the mold frame 504 are loaded onto the rotational motion frame 704 of the mold transfer system 312. Then one or more optional operator safety operations may occur, such as for example, the rollup door 1804 at the demold station 310 closes and the safety scanner 1806 scans the area at and around the demold station 310 for the presence of an operator 1802 or body parts thereof.

The shuttle 318 then moves the mold 500 upward to a moving height. For example, the vertical motion frame 702 of the shuttle 318 moves the mold 500 vertically away from the facility floor 400 by about 15 inches (about 38.1 cm). The shuttle 318 also rotates the mold 500 so that the negative side 601 (Class A side) is facing downward. For example, in a preferred embodiment, the shuttle 318 rotates the mold 500 about 90 degrees. In some embodiments, the upward movement of the mold 500 and the rotational movement of the mold 500 occur sequentially. In some embodiments, the upward movement of the mold 500 and the rotational movement of the mold 500 occur simultaneously.

Heating the Mold

Figure 20A:
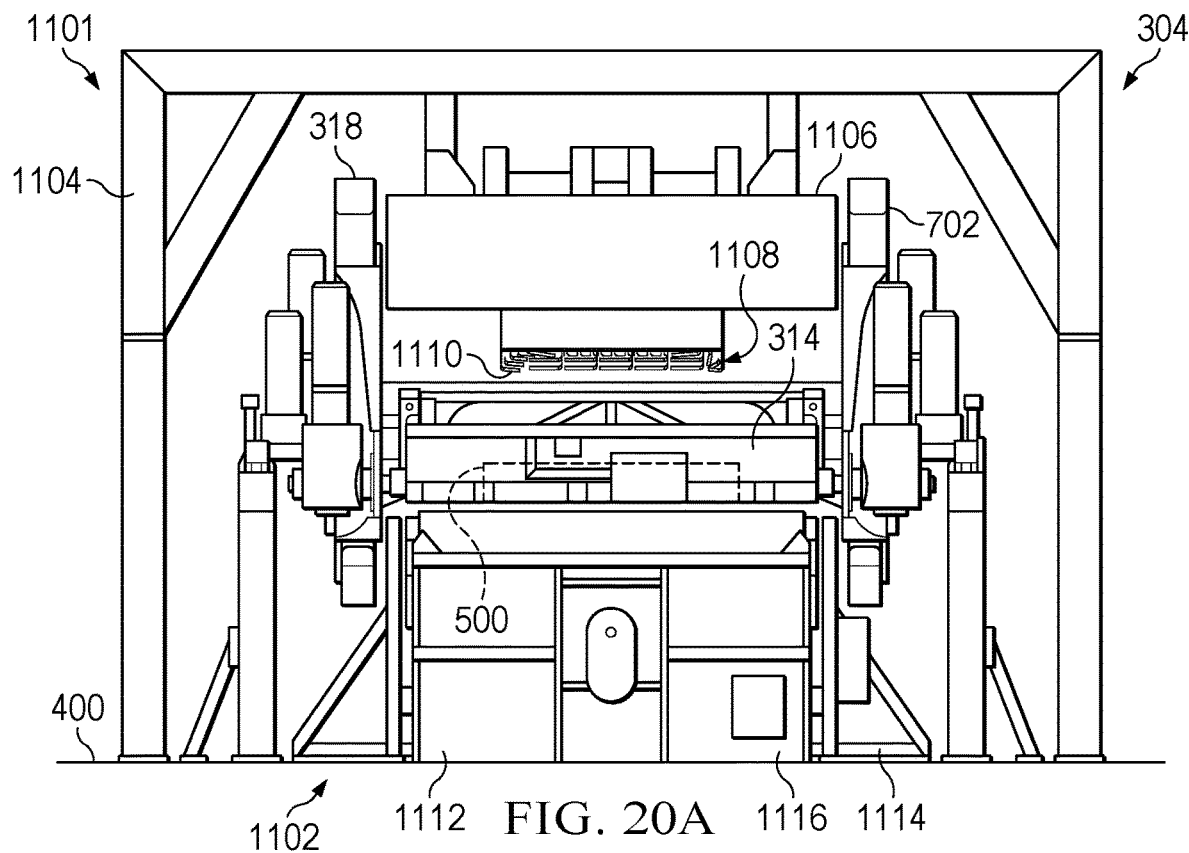
FIG. 20A is a front view of the heating station of FIG. 11 with the shuttle of FIG. 7 carrying a mold located between a first heater and a second heater in accordance with the present invention.
Figure 20B:
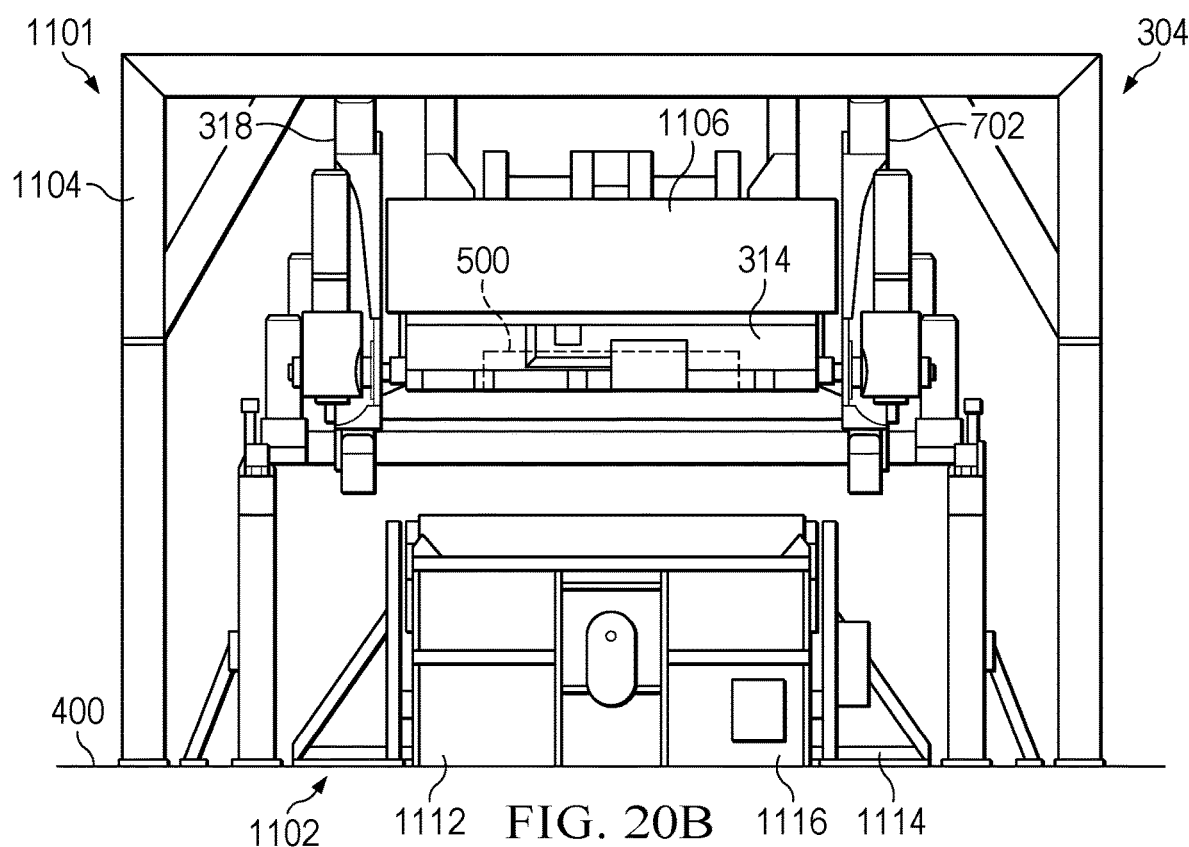
FIG. 20B is a front view of the heating station of FIG. 11 with the shuttle of FIG. 7 carrying the mold, wherein the mold is raised toward the first heater in accordance with the present invention.

The step of heating the mold in a pre-cast heating step at block 1904 includes the shuttle 318 moving the mold 500 to the heating station 304, as shown in FIG. 20A. For example, the horizontal motion frame 700 moves the mold 500 horizontally from the demold station 310 to the heating station 304 by about 310 inches (about 787.4 cm). As shown in FIGS. 15 and 20B, the shuttle 318 also moves the mold 500 upward toward the first heater 1101 until the mold 500 is at the desired position with respect to the heating elements 1108. For example, in a preferred embodiment, the vertical motion frame 702 moves the mold 500 vertically away from the facility floor 400. Where the heating elements 1108 are infrared emitters 1110, the mold 500 is in the desired position when the positive side 602 of the mold 500 is in a range of about 10 mm to about 100 mm away from the infrared emitters 1110. Preferably, the mold 500 is in the desired position when the positive side 602 of the mold 500 is in a range of about 20 mm to about 50 mm away from the infrared emitters 1110. Most preferably, the mold 500 is in the desired position when the positive side 602 of the mold 500 is about 30 mm away from the infrared emitters 1110. Additionally, when the mold 500 is in the desired position, at least a portion of the mold assembly 314 is disposed within the cover hood 1106.

Figure 20C:
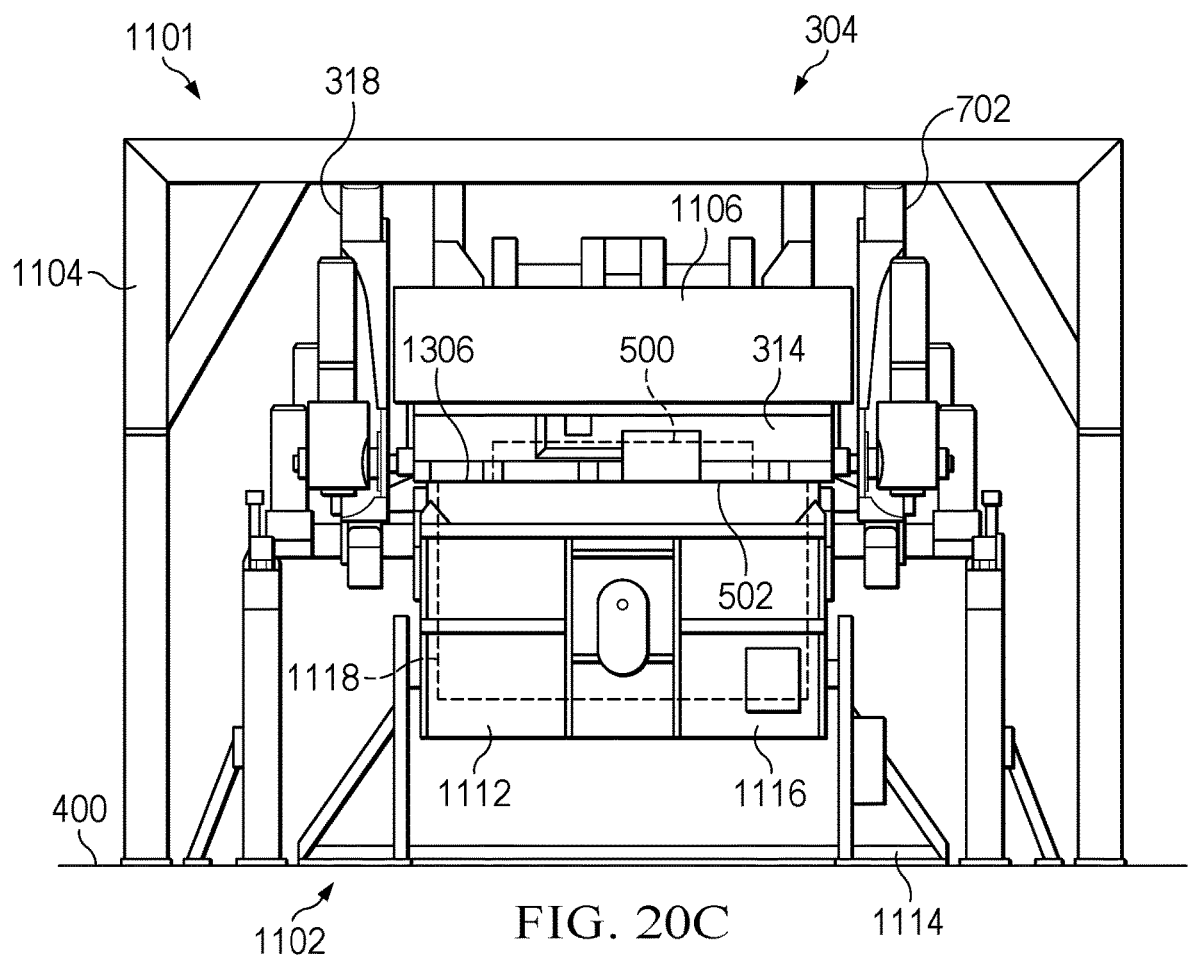
FIG. 20C is a front view of the heating station of FIG. 11 with the shuttle of FIG. 7 carrying the mold, wherein the mold is raised toward the first heater and the second heater raised toward the mold in accordance with the present invention.

Additionally, as shown in FIG. 20C, during the pre-cast heating step, the lift 1114 raises the convection heater 1112 upward toward the mold 500 until the top 1306 of the inner box 1118 contacts the mold plate 502. In some embodiments, the upward movement of the mold 500 and the convection heater 1112 occur sequentially. In some embodiments, the upward movement of the mold 500 and the convection heater 1112 occur simultaneously.

Once the first heater 1101 and the second heater 1102 are in the desired locations, the first heater 1101 and the second heater 1102 are then operated to heat the mold 500 to a pre-cast temperature. Preferably, the infrared emitters 1110 of the first heater 1101 heat the positive side 602 of the mold 500 and heated air circulated within the convection heater 1112 of the second heater 1102 heats the negative side 601 of the mold 500. In the convection heater 1112, the air is heated to no more than 300 degrees Celsius and the airflow near the mold 500 ranges from about 0.25 m/s to about 0.5 m/s. The pre-cast temperature ranges from about 150 degrees Celsius to about 300 degrees Celsius. Preferably, the pre-cast temperature ranges from about 180 degrees Celsius to about 250 degrees Celsius. More preferably, the pre-cast temperature ranges from about 240 degrees Celsius to about 250 degrees Celsius. Most preferably, the pre-cast temperature is about 243 degrees Celsius. The duration of the pre-cast heating ranges from about 15 seconds to about 45 seconds. Preferably, the duration of the pre-cast heating is about 30 seconds.

Following the pre-cast heating, the lift 1114 lowers the convection heater 1112 and the vertical motion frame 702 lowers the mold 500 away from the array of heating elements 1108. The vertical motion frame 702 moves the mold 500 downward a sufficient distance so that the horizontal motion frame 700 can move the mold 500 toward the powder station 302 without the mold frame 504 hitting the cover hood 1106 of the first heater 1101. In some embodiments, the downward movement of the mold 500 and the convection heater 1112 occur sequentially. In some embodiments, the downward movement of the mold 500 and the convection heater 1112 occur simultaneously.

Providing a First Powder Box

The exemplary step of providing the first powder box 914 shown in block 1906 of FIG. 19 includes filling the first powder box 914 with the first polymeric powder 921. The first powder box assembly 901 is then moved along the pair of rails 904 from the first staging area 909 to the casting area 912. For example, the motor 920 on the first powder box assembly 901 operates to move the first powder box 914, the powder shuttle 916, and the powder box frame 918 of the first powder box assembly 901.

Coupling the Mold to the First Powder Box

The exemplary step of coupling the mold 500 to the first powder box 914 shown in block 1908 of FIG. 19 includes the shuttle 318 moving the mold 500 to above the casting area 912 of the powder station 302 so that the mold 500 is above the first powder box 914 (with the first polymeric powder 921 therein). For example, the horizontal motion frame 700 moves the mold 500 horizontally from the heating station 304 to the powder station 302 by about 110 inches (about 279.4 cm).

The system 300 may optionally scan the temperature of the mold 500. If the temperature of the mold 500 is not at the desired pre-cast temperature, the shuttle 318 moves the mold 500 back to the heating station 304 to be reheated to the pre-cast temperature. Otherwise, the shuttle 318 moves the mold 500 downward toward the powder box frame 918 of the first powder box assembly 901. For example, in a preferred embodiment, the vertical motion frame 702 moves the mold 500 downward by about 30 inches (about 76.2 cm).

The mold frame 504 then couples with the powder box frame 918 of the first powder box assembly 901. For example, in some embodiments, the clamps 508 on the mold frame 504 couple with the hooks 1002 on the powder box frame 918. In response to being coupled together, the seal 1000 of the first powder box 914 is pressed against the mold 500, and the first powder box 914, the seal 1000, and the mold 500 cooperate to form a sealed chamber.

Forming the First Polymer Layer on the Negative Side of the Mold

After the mold 500 is coupled to the first powder box 914, the exemplary step of forming the first polymer layer 201 on the negative side 601 of the mold 500 shown in block 1910 of FIG. 19 can begin. The shuttle 318 moves the mold 500 and first powder box 914 upward. For example, the vertical motion frame 702 moves the mold 500 and first powder box 914 upward by about 30 inches (about 76.2 cm).

Once the mold 500 is moved a sufficient distance upward from the floor 400 so that the mold 500 can be rotated without interference, the shuttle 318 rotates the mold 500 and first powder box 914, in a first rotation step, about the rotation axis 832. During the first rotation step, the heat of the mold 500 from the pre-cast heating step causes at least a portion of the first polymeric powder 921 in the first powder box 914 to melt and form the first polymer layer 201 on the negative side 601 of the mold 500. Because the negative side 601 of the mold 500 has the Class A features, the first polymer layer 201 takes on the Class A features of the mold 500. In some embodiments, the first rotation step has a duration of about 10 seconds to about 45 seconds. Preferably, the first rotation step has a duration of about 25 seconds. In some embodiments, the mold 500 and the first powder box 914 are rotated about the rotation axis 832 through at least two revolutions. During the first rotation step, the temperature of the mold 500 is from about 235 degrees Celsius to about 240 degrees Celsius. Preferably, during the first rotation step, the temperature of the mold 500 is about 237 degrees Celsius. During the first rotation step, the mold 500 is rotated in a range of about 30 rpm to about 100 rpm. Preferably, the mold 500 is rotated in a range of about 30 rpm to about 60 rpm. More preferably, the mold 500 is rotated at about 50 rpm. This rotation is faster and generates higher centrifugal forces than prior slush molding systems and results in pushing more of the first polymeric powder 921 into the complex geometric shapes of the negative side 601 of the mold 500. This also results in generating a more even first polymer layer 201. After the first rotation step, one or more pneumatic knockers (not shown) on the mold frame 504 may be actuated to knock any loose, unmelted portions of the first polymeric powder 921 from the mold 500.

Decoupling the Mold from the First Powder Box

After the first polymer layer 201 is formed on the mold 500, the exemplary step of decoupling the mold 500 from the first powder box 914 shown in block 1912 of FIG. 19 can begin. The shuttle 318 moves the mold 500 and first powder box 914 downward until the first powder box 914 is disposed in the powder shuttle 916 of the first powder box assembly 901. For example, the vertical motion frame 702 moves the mold 500 and first powder box 914 vertically toward the facility floor 400 by about 30 inches (about 76.2 cm).

In response to the first powder box 914 being disposed in the powder shuttle 916 of the first powder box assembly 901, the mold 500 and the first powder box 914 are decoupled, for example, by releasing the clamps 508 from the hooks 1002. The first powder box assembly 901 is then moved along the pair of rails 904 from the casting area 912 and returned to the first staging area 909. For example, the motor 920 on the first powder box assembly 901 operates to move the first powder box 914, the powder shuttle 916, and the powder box frame 918 of the first powder box assembly 901. Once the first powder box 914 is returned to the first staging area 909, the first powder box 914 may be filled with additional first polymeric powder 921. In some embodiments, the first powder box 914 may be weighed to determine the amount of first polymeric powder 921 to place in the first powder box 914. In some embodiments, the first powder box 914 may be refilled with a set amount of first polymeric powder 921 after each first casting step.

Optional Interim Heating Step

In some embodiments, after the first polymer layer 201 is formed, the optional interim heating step shown in block 1914 of FIG. 19 may be conducted. With reference again to FIG. 20A, the shuttle 318 moves the mold 500 to the heating station 304. For example, the horizontal motion frame 700 moves the mold 500 horizontally from the powder station 302 to the heating station 304 by about 110 inches (about 279.4 cm). With reference again to FIGS. 15 and 20B, the shuttle 318 then moves the mold 500 upward toward the first heater 1101 until the mold 500 is at the desired position with respect to the heating elements 1108. For example, in a preferred embodiment, the vertical motion frame 702 moves the mold 500 vertically away from the facility floor 400. Where the heating elements 1108 are infrared emitters 1110, the mold 500 is in the desired position when the positive side 602 of the mold 500 is in a range of about 10 mm to about 100 mm away from the infrared emitters 1110. Preferably, the mold 500 is in the desired position when the positive side 602 of the mold 500 is in a range of about 20 mm to about 50 mm away from the infrared emitters 1110. Most preferably, the mold 500 is in the desired position when the positive side 602 of the mold 500 is about 30 mm away from the infrared emitters 1110. Additionally, when the mold 500 is in the desired position, at least a portion of the mold assembly 314 is disposed within the cover hood 1106.

With reference again to FIG. 20C, the lift 1114 raises the convection heater 1112 upward toward the mold 500 until the top 1306 of the inner box 1118 contacts the mold plate 502. In some embodiments, the upward movement of the mold 500 and the convection heater 1112 occur sequentially. In some embodiments, the upward movement of the mold 500 and the convection heater 1112 occur simultaneously.

Once the first heater 1101 and the second heater 1102 are in the desired locations with respect to the mold 500, the first heater 1101 and the second heater 1102 are then operated to heat the mold 500 to an interim temperature. Preferably, the infrared emitters 1110 of the first heater heat the positive side 602 of the mold 500 and heated air circulated within the convection heater 1112 of the second heater 1102 heats the first polymer layer 201 on the negative side 601 of the mold 500. In the convection heater 1112, the air is heated to no more than 300 degrees Celsius and the airflow near the mold 500 ranges from about 0.25 m/s to about 0.5 m/s. The interim temperature ranges from about 150 degrees Celsius to about 250 degrees Celsius. Preferably, the interim temperature ranges from about 180 degrees Celsius to about 225 degrees Celsius. More preferably, the interim temperature ranges from about 190 degrees Celsius to about 200 degrees Celsius. Most preferably, the interim temperature is about 198 degrees Celsius. The duration of the interim heating ranges from about 5 seconds to about 45 seconds. Preferably, the duration of the interim heating is about 5 seconds. In some embodiments, only one of the first heater 1101 or the second heater 1102 may be operated. For example, during the optional interim heating step at block 1914, only the first heater 1101 is operated. In another example, during the optional interim heating step at block 1914, only the second heater 1102 is operated.

Following the interim heating, the lift 1114 lowers the convection heater 1112 and the vertical motion frame 702 lowers the mold 500 away from the array of heating elements 1108. The vertical motion frame 702 moves the mold 500 downward a sufficient distance so that the horizontal motion frame 700 can move the mold 500 toward the powder station 302 without the mold frame 504 hitting the cover hood 1106 of the first heater 1101. In some embodiments, the downward movement of the mold 500 and the convection heater 1112 occur sequentially. In some embodiments, the downward movement of the mold 500 and the convection heater 1112 occur simultaneously. The shuttle 318 then moves the mold 500 to above the casting area 912 of the powder station 302. For example, the horizontal motion frame 700 moves the mold 500 horizontally from the heating station 304 to the powder station 302 by about 110 inches (about 279.4 cm). Following the optional interim heating step, the process continues to the second casting step.

Providing a Second Powder Box

The exemplary step of providing the second powder box 915 shown in block 1916 of FIG. 19 includes filling the second powder box 915 with a second polymeric powder 922. The second powder box assembly 902 is then moved along the pair of rails 904 from the second staging area 910 to the casting area 912. For example, the motor 920 on the second powder box assembly 902 operates to move the second powder box 915, the powder shuttle 916, and the powder box frame 918 of the second powder box assembly 902.

Coupling the Mold to the Second Powder Box

Prior to coupling the mold 500 to the second powder box 915, the system 300 may optionally scan the temperature of the mold 500. If the temperature of the mold 500 is not at the desired temperature, the shuttle 318 moves the mold 500 back to the heating station 304 to be reheated. Otherwise, the system 300 proceeds with coupling the mold 500 to the second powder box 915. If no interim or additional heating of the mold is conducted, the shuttle 318 remains above the casting area 912 of the powder station 302 following the step of decoupling the mold 500 from the first powder box 914.

The exemplary step of coupling the mold 500 to the second powder box 915 shown in block 1918 of FIG. 19 includes the shuttle 318 moving the mold 500 downward toward the powder box frame 918 of the second powder box assembly 902. For example, the vertical motion frame 702 moves the mold 500 downward by about 30 inches (about 76.2 cm). The mold frame 504 then couples with the powder box frame 918 of the second powder box assembly 902. For example, in some embodiments, the clamps 508 on the mold frame 504 couple with the hooks 1002 on the powder box frame 918. In response to being coupled together, the seal 1000 of the second powder box 915 is pressed against the mold 500, and the second powder box 915, the seal 1000, and the mold 500 cooperate to form a sealed chamber.

Forming the Second Polymer Layer

After the mold 500 is coupled to the second powder box 915, the exemplary step of forming the second polymer layer 202 on the first polymer layer 201 shown in block 1920 of FIG. 19 can begin. The shuttle 318 moves the mold 500 and second powder box 915 upward. For example, the vertical motion frame 702 moves the mold 500 and second powder box 915 upward by about 30 inches (about 76.2 cm).

Once the mold 500 is moved a sufficient distance upward from the floor 400 so that the mold 500 can be rotated without interference, the shuttle 318 rotates the mold 500 and second powder box 915, in a second rotation step, about the rotation axis 832. During the second rotation step, the heat of the mold 500 from either the pre-cast heating step or the optional interim heating step causes at least a portion of the second polymeric powder 922 in the second powder box 915 to melt and form the second polymer layer 202 on the first polymer layer 201. Melting and forming the second polymer layer 202 directly on the first polymer layer 201 during this step eliminates the need to separately cut and adhere a second layer to the first polymer layer 201. In some embodiments, the second rotation step has a duration of about 10 seconds to about 45 seconds. Preferably, the second rotation step has a duration of about 25 seconds. In some embodiments, the mold 500 and the second powder box 915 are rotated about the rotation axis 832 through at least two revolutions. During the second rotation step, the temperature of the mold 500 is from about 185 degrees Celsius to about 195 degrees Celsius. Preferably, during the second rotation step, the temperature of the mold 500 is about 192 degrees Celsius. During the second rotation step, the mold 500 is rotated in a range of about 30 rpm to about 100 rpm. Preferably, the mold 500 is rotated in a range of about 30 rpm to about 60 rpm. More preferably, the mold 500 is rotated at about 50 rpm. This rotation is faster and generates higher centrifugal forces than prior slush molding systems and results in pushing more of the second polymeric powder 922 into the first polymeric powder 921. This also results in aiding in adhesion between the second polymer layer 202 and the first polymer layer 201 and generating a more even second polymer layer 202. After the second rotation step, one or more pneumatic knockers (not shown) on the mold frame 504 may be actuated to knock any loose, unmelted portions of the second polymeric powder 922 from the mold 500.

Decoupling the Mold from the Second Powder Box

After the second polymer layer 202 is formed on the first polymer layer 201, the exemplary step of decoupling the mold 500 from the second powder box 915 shown in block 1922 of FIG. 19 can begin. The shuttle 318 moves the mold 500 and second powder box 915 downward until the second powder box 915 is disposed in the powder shuttle 916 of the second powder box assembly 902. For example, the vertical motion frame 702 moves the mold 500 and second powder box 915 vertically toward the facility floor 400 by about 30 inches (about 76.2 cm).

In response to the second powder box 915 being disposed in the powder shuttle 916 of the second powder box assembly 902, the mold 500 and the second powder box 915 are decoupled, for example, by releasing the clamps 508 from the hooks 1002. The second powder box assembly 902 is moved along the pair of rails 904 from the casting area 912 and returned to the second staging area 910. For example, the motor 920 on the second powder box assembly 902 operates to move the second powder box 915, the powder shuttle 916, and the powder box frame 918 of the second powder box assembly 902. Once the second powder box 915 is returned to the second staging area 910, the second powder box 915 is filled with additional second polymeric powder 922. In some embodiments, the second powder box 915 may be weighed to determine the amount of second polymeric powder 922 to place in the second powder box 915. In some embodiments, the second powder box 915 may be refilled with a set amount of second polymeric powder 922 after each second casting step.

Post-Cast Heating

After the second polymer layer 202 is formed on the first polymer layer 201, the post-cast heating step shown in block 19124 of FIG. 19 is conducted. With reference again to FIG. 20A, the shuttle 318 moves the mold 500 back to the heating station 304. For example, the horizontal motion frame 700 moves the mold 500 horizontally from the powder station 302 to the heating station 304 by about 110 inches (about 279.4 cm).

With reference again to FIGS. 15 and 20B, the shuttle 318 moves the mold 500 upward toward the first heater 1101 until the mold 500 is at the desired position with respect to the heating elements 1108. For example, in a preferred embodiment, the vertical motion frame 702 moves the mold 500 vertically away from the facility floor. Where the heating elements 1108 are infrared emitters 1110, the mold 500 is in the desired position when the positive side 602 of the mold 500 is in a range of about 10 mm to about 100 mm away from the infrared emitters 1110. Preferably, the mold 500 is in the desired position when the positive side 602 of the mold 500 is in a range of about 20 mm to about 50 mm away from the infrared emitters 1110. Most preferably, the mold 500 is in the desired position when the positive side 602 of the mold 500 is about 30 mm away from the infrared emitters 1110. Additionally, when the mold 500 is in the desired position, at least a portion of the mold assembly 314 is disposed within the cover hood 1106.

With reference again to FIG. 20C, the lift 1114 raises the convection heater 1112 upward toward the mold 500 until the top 1306 of the inner box 1118 contacts the mold plate 502. In some embodiments, the upward movement of the mold 500 and the convection heater 1112 occur sequentially. In some embodiments, the upward movement of the mold 500 and the convection heater 1112 occur simultaneously. Once the first heater 1101 and the second heater 1102 are in the desired locations with respect to the mold 500, the first heater 1101 and the second heater 1102 are then operated to heat the mold 500 to a post-cast temperature. The infrared emitters 1110 of the first heater 1101 heat the positive side 602 of the mold 500 and heated air circulated within the convection heater 1112 of the second heater 1102 heats the second polymer layer 202 on the negative side 601 of the mold 500.

During the post-cast heating step, the heat stabilizer and foaming agent of the second polymeric powder 922 cause air bubbles to form in the second polymer layer 202. Accordingly, the second polymer layer 202 becomes a foam layer. The foaming of the second polymer layer 202 results in a soft, pliable, and resilient second polymer layer 202 and part 100. Thus, during the post-cast heating step, the second polymer layer 202 expands in thickness from a first thickness to a second thickness. The second thickness ranges from about 3.0 mm to about 5.00 mm. Preferably, the second thickness is about 3.5 mm. However, in some cases, the foaming of the second polymer layer 202 can result in a non-uniform second thickness. For example, there may be air pockets within the second polymer layer 202 and/or imperfections across the back side of the second polymer layer 202 that cause the thickness of the second polymer layer 202 to not be constant across its surface.

In the convection heater 1112, the air is heated to no more than 300 degrees Celsius and the airflow near the mold 500 ranges from about 0.25 m/s to about 0.5 m/s. The post-cast temperature ranges from about 150 degrees Celsius to about 250 degrees Celsius. Preferably, the post-cast temperature ranges from about 175 degrees Celsius to about 225 degrees Celsius. More preferably, the post-cast temperature ranges from about 180 degrees Celsius to about 200 degrees Celsius. Most preferably, the post-cast temperature is about 180 degrees Celsius. The duration of the post-cast heating ranges from about 15 seconds to about 45 seconds. Preferably, the duration of the interim post-cast heating is about 20 seconds.

In some embodiments, only one of the first heater 1101 or the second heater 1102 may be operated. For example, during the post-cast heating step at block 1924, only the first heater 1101 is operated. In another example, during the post-cast heating step at block 1924, only the second heater 1102 is operated. In some situations, adding too much heat to the positive side 602 of the mold 500 can burn the first polymer layer 201. As the first polymer layer 201 is the Class A surface of the part 100 that will be seen and touched by an end user (e.g., driver or passenger of an automobile in which the part 110 is installed), burning the first polymer layer 201 is undesirable. Accordingly, it may be preferred that during the post-cast heating step at block 1924, only the second heater 1102 is operated to supply heat to the second polymer layer 202 in order to avoid burning the first polymer layer 201. In such embodiments, the first heater 1101 is not operated to avoid providing too much heat to the positive side 602 of the mold 500, reducing or eliminating the possibility of burning the first polymer layer 201.

Following the post-cast heating, the lift 1114 lowers the convection heater 1112 and the vertical motion frame 702 lowers the mold 500 away from the array of heating elements 1108. The vertical motion frame 702 moves the mold 500 downward a sufficient distance so that the horizontal motion frame 700 can move the mold 500 toward the calibration station 306 without the mold frame 504 hitting the cover hood 1106 of the first heater 1101. In some embodiments, the downward movement of the mold 500 and the convection heater 1112 occur sequentially. In some embodiments, the downward movement of the mold 500 and the convection heater 1112 occur simultaneously.

Calibration

Following the post-cast heating step, wherein the second polymer layer 202 foams and increases thickness, the exemplary step of compressing the second polymer layer 202 shown in block 1926 of FIG. 19 is conducted. The shuttle 318 moves the mold 500 from the heating station 304 to above the calibration station 306. For example, the horizontal motion frame 700 moves the mold 500 horizontally from the heating station 304 to above the calibration station 306 by about 110 inches (about 279.4 cm). Once above the calibration station 306, the shuttle 318 moves the mold 500 downward toward the calibration plug 1604. For example, the vertical motion frame 702 moves the mold 500 downward by about 40 inches (about 101.6 cm).

Figure 21:
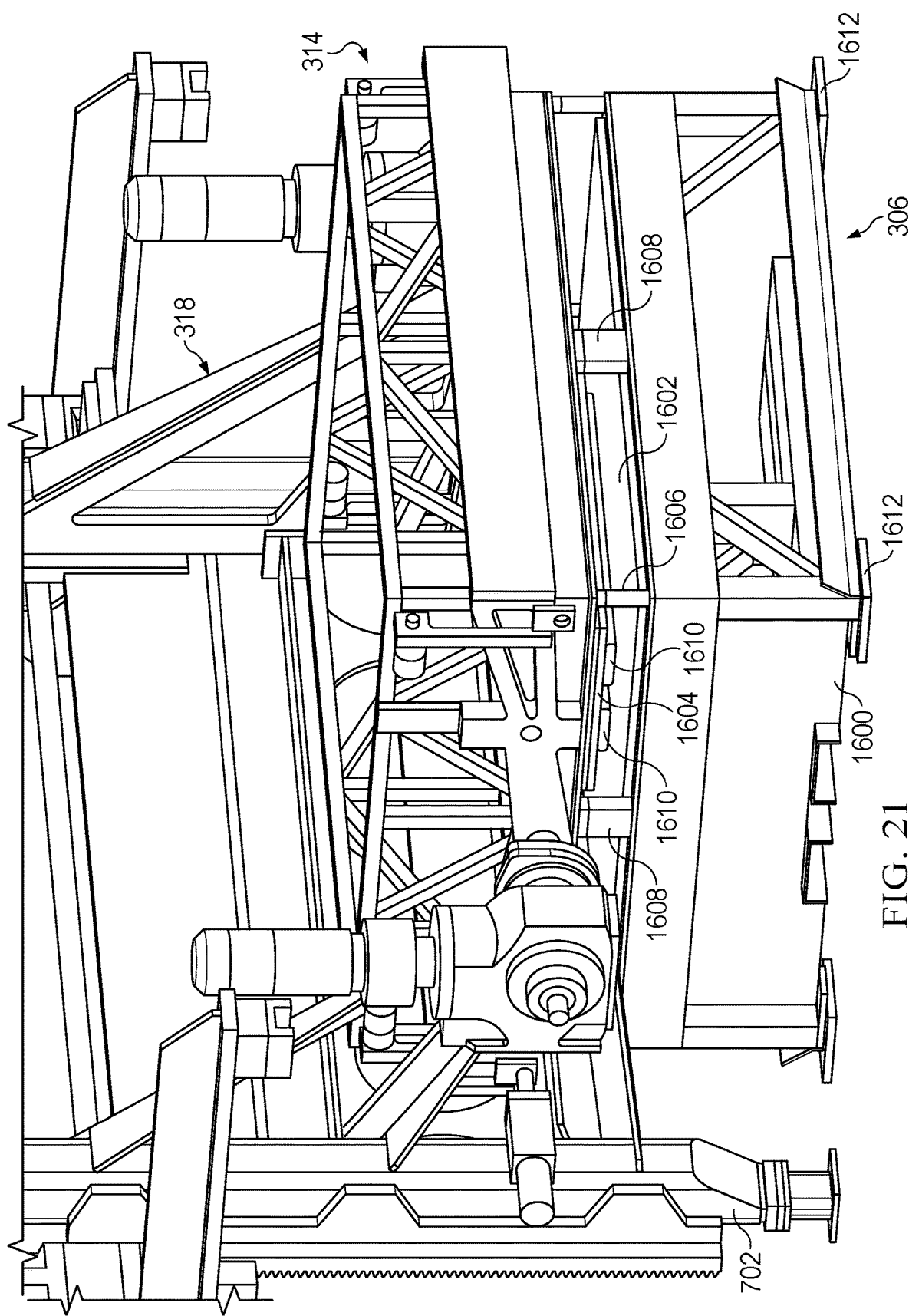
FIG. 21 is an isometric view of the shuttle of FIG. 7 carrying a mold assembly located above the calibration station of FIG. 16 in accordance with the present invention.
Figure 22A:
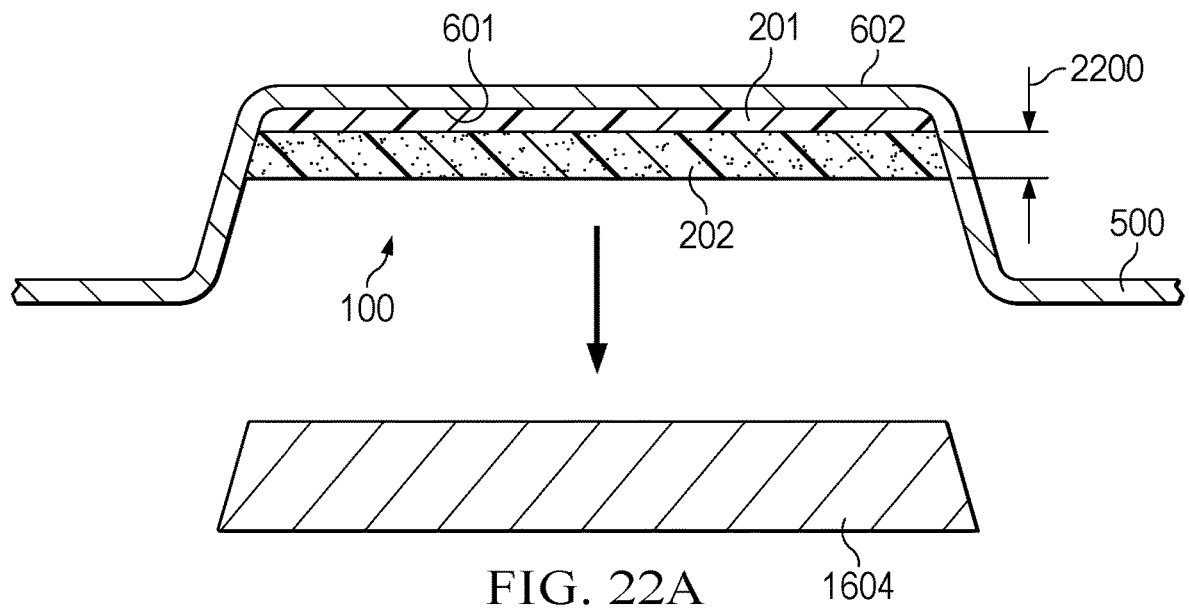
FIG. 22A is a section view of an exemplary calibration plug proximate to a second polymer layer of an exemplary part in accordance with the present invention.
Figure 22B:
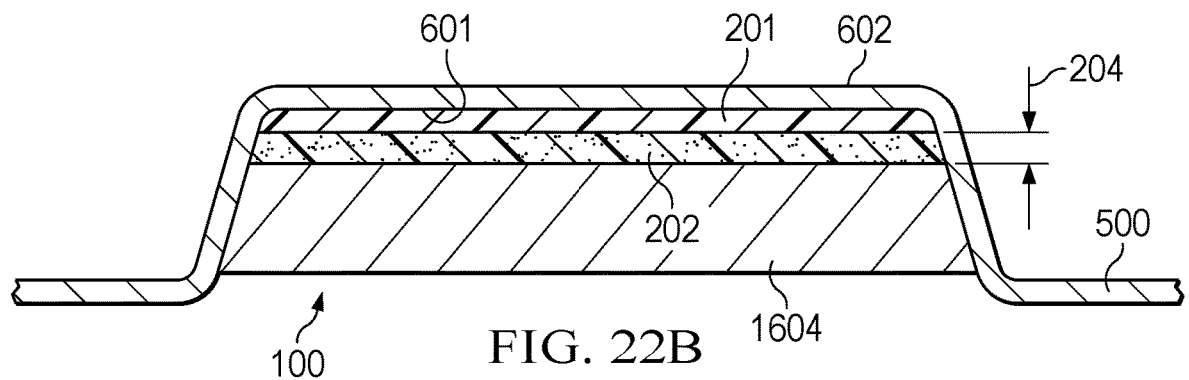
FIG. 22B is a section view of an exemplary calibration plug pressed against a second polymer layer of an exemplary part in accordance with the present invention.

With reference to FIGS. 21, 22A, and 22B, the downward movement of the mold 500 presses the Class B side of the second polymer layer 202 (i.e., wherein the Class B side of the second polymer layer 202 is opposite the first polymer layer 201) against the calibration plug 1604, which in turn compresses the second polymer layer 202. Accordingly, at the calibration station 306, the second polymer layer 202 is compressed by the calibration plug 1604 from the second thickness 2200 (see FIG. 22A) to the third thickness 204 (see FIGS. 2 and 22B). The third thickness is less than the second thickness. As noted above, in some cases, the foaming of the second polymer layer 202 can result in a non-uniform second thickness 2200. Compressing the second polymer layer 202 using the calibration plug 1604 aids in setting the foam and results in a uniform or substantially uniform third thickness 204 of the second polymer layer 202. The third thickness 204 ranges from about 2.0 mm to about 5.0 mm. Preferably, the third thickness 204 ranges from about 2.5 mm to about 3.0 mm. In some embodiments, the third thickness 204 is about 2.5 mm. In some embodiments, the third thickness is about 3.0 mm.

During compression of the second polymer layer 202, the temperature of the second polymer layer 202 ranges from about 120 degrees Celsius to about 160 degrees Celsius. Preferably, the temperature of the second polymer layer 202 is about 140 degrees Celsius. The duration of the compression of the second polymer layer 202 ranges from about 3 seconds to about 30 seconds. In some embodiments, the duration of compression of the second polymer layer 200 is about 5 seconds. In some embodiments, the duration of compression of the second polymer layer 202 is about 20 seconds. Further during compression of the second polymer layer 202, the calibration plug 1604 and the second polymer layer 202 are pressed against one another with a compression pressure greater than or equal to about 3 $lbf/in^2$ (about 20.7 kPa). Preferably, the calibration plug 1604 and the second polymer layer 202 are pressed against one another with a compression pressure of about 5 $lbf/in^2$ (about 34.5 kPa). Additionally, during compression of the second polymer layer 202, the generally circular cross section of the pores of the foam of the second polymer layer 202 is transformed into a generally oval shape cross section.

In embodiments, in which the calibration station 306 includes one or more centering pins 1606 and one or more zero plates 1608, the shuttle 318 moves the mold 500 downward toward the calibration plug 1604. The mold frame 504 cooperates with the centering pins 1606 to ensure that the mold 500 is aligned with the calibration plug 1604. Additionally, the mold frame 504 contacts the zero plates 1608 to ensure that the mold 500 is the proper distance from the calibration plug 1604. In embodiments in which the calibration station includes the one or more air cushions 1610, the air cushions 1610 are inflated to push the calibration plug 1604 into the second polymer layer 202. The air cushions 1610 are used to apply the compression force to the second polymer layer 202. After compressing the second polymer layer 202 to the third thickness, the shuttle 318 moves the mold 500 upward away from the calibration plug 1604. For example, the vertical motion frame 702 moves the mold 500 vertically away from the calibration plug 1604 by about 40 inches (about 101.6 cm).

Cooling Step

Following the compression step, the exemplary step of cooling the mold 500 shown in block 1928 of FIG. 19 is conducted. The shuttle 318 moves the mold 500 from the calibration station 306 to the cooling station 308. For example, the horizontal motion frame 700 moves the mold 500 horizontally from the calibration station 306 to the cooling station 308 by about 110 inches (about 279.4 cm). The shuttle 318 then moves the mold 500 upward. For example, the vertical motion frame 702 moves the mold 500 vertically away from the facility floor by about 20 inches (about 50.8 cm). Following the upward movement, the shuttle 318 rotates the mold 500 so that the positive side 602 is facing downward and the second polymer layer 202 is facing upward. For example, in a preferred embodiment, the shuttle 318 rotates the mold 500 about 180 degrees. In some embodiments, the upward movement, the horizontal movement, and the rotational movement of the mold 500 occur sequentially. In some embodiments, the upward movement, the horizontal movement, and the rotational movement of the mold 500 occur simultaneously.

Following rotation of the mold 500, the shuttle 318 moves the mold 500 downward toward the cooling box 1700 of the cooling station 308. For example, the vertical motion frame 702 moves the mold 500 downward by about 45 inches (about 114.3 cm). The mold assembly 314 is moved downward until the mold plate 502 contacts the top 1706 of the cooling box 1700. As shown in FIG. 23, the mold plate 502 and the mold 500 close the open top 1706 and cooperate with the cooling box 1700 to seal the cooling chamber 1704. With the positive side 602 of the mold 500 facing the spray nozzles 1708 and the cooling chamber 1704 sealed by the mold plate 502 and the mold 500, a cooling fluid (e.g., water) is sprayed from the spray nozzles 1708 onto the positive side 602 of the mold 500 to cool the mold 500.

In some embodiments, the spray nozzles 1708 spray cooling fluid for a duration of about 5 seconds to about 60 seconds. Preferably, the spray nozzles 1708 spray cooling fluid for a duration of about 5 seconds to about 20 seconds. Preferably, the spray nozzles 1708 spray cooling fluid for a duration of about 10 seconds. During the cooling step, the mold 500 is cooled to a temperature of about 100 degrees Celsius to about 20 degrees Celsius. Preferably, the mold 500 is cooled to a temperature of about 60 degrees Celsius to about 50 degrees Celsius. More preferably, the mold 500 is cooled to a temperature of about 55 degrees Celsius. Preferably, the cooling fluid is water; however, in some embodiments, other cooling fluids may be used.

Once the mold 500 has been cooled to a desired temperature, the shuttle 318 then moves the mold 500 upward. For example, the vertical motion frame 702 moves the mold 500 vertically away from the cooling box 1700 by about 45 inches (about 114.3 cm). Following the upward movement, the shuttle 318 rotates the mold 500 so that the positive side 602 is facing toward the demold station 310. For example, in a preferred embodiment, the shuttle 318 rotates the mold 500 about 90 degrees. In some embodiments, the upward movement and the rotational movement of the mold 500 occur sequentially. In some embodiments, the upward movement and the rotational movement of the mold 500 occur simultaneously.

Demold

Following the cooling step, the exemplary step of removing the part 100 from the mold 500 shown in block 1930 of FIG. 19 is conducted. The shuttle 318 moves the mold 500 from the cooling station 308 to the demold station 310. For example, the horizontal motion frame 700 moves the mold 500 horizontally from the cooling station 308 to the demold station 310 by about 90 inches (about 228.6 cm). Following the horizontal movement, the shuttle 318 rotates the mold 500 so that the negative side 601 is perpendicular to the facility floor 400. In this orientation, as shown in FIG. 18, the part 100 is configured to face the operator 1802. For example, in a preferred embodiment, the shuttle 318 rotates the mold 500 about 90 degrees. The shuttle 318 then moves the mold 500 downward. For example, the vertical motion frame 702 moves the mold 500 vertically toward the facility floor 400 by about 35 inches (about 88.9 cm). Rotating the mold 500 and moving the mold 500 downward places the part 100 formed by the first polymer layer 201 and the second polymer layer 202 in a location that is accessible by the operator 1802. In some embodiments, the horizontal movement, the rotational movement, and the upward movement of the mold 500 occur sequentially. In some embodiments, the horizontal movement, the rotational movement, and the upward movement of the mold 500 occur simultaneously. One the mold 500 is in position, the rollup door 1804 opens and the operator 1802 can move to the mold 500. The operator 1802 then removes the part 100 from the mold 500. Once the part 100 is removed from the mold 500, the process may end at block 1932 of FIG. 19 or the process may restart at block 1900 in order to produce another part 100.

The articles or parts described herein are, for example, interior components of an automotive vehicle, such as an instrument panel, an A-pillar, a B-pillar, a C-pillar, a steering wheel skin, an airbag cover, a seamless airbag door, a door trim panel, a door handle, a pillar handle, a roof handle, a center console, a knee bolster, a seat mechanism cover, a sun visor, and the like. Although described with respect to producing interior components of an automotive vehicle, the articles or parts produced with the systems, apparatuses, and methods herein are not limited to automotive components and may include any type of slush molded item, such as for example, furniture, toys, shoes, household goods, and components therefor.

The systems, apparatuses, and methods described herein provide significant advantages. For example, the dual cast slush mold system 300 is able to produce a part 100 with a much-reduced cycle time compared to prior systems and methods. Additionally, the dual cast slush mold system 300 is able to produce a part 100 with a much-reduced amount of scrap. For example, wherein the part is an instrument panel 100, the only scrap may be the portions cut out for HVAC vents. Additionally, the part 100 produced may be 100% recyclable. Additionally, the dual cast slush mold system 300 is able to produce a part 100 with a better radius definition. Moreover, the systems, apparatuses, and methods described herein provide significant cost savings, for example, through the decreased cycle time, decreased scrap rates, elimination of the steps of gluing a foam layer to a skin layer, etc.

The following Enumerated Embodiments are presented to illustrate certain aspects of the disclosure, and are not intended to limit its scope:

Enumerated Embodiment 1. A method of manufacturing an automotive interior trim panel, the method comprising:
providing a mold having a negative side and a positive side;
heating the mold, in a pre-cast heating step, to a pre-cast temperature;
providing a first powder box containing a first polymeric powder;
coupling the mold to the first powder box;
rotating the mold and the first powder box, in a first rotation step, during which at least a portion of the first polymeric powder melts and forms a first polymer layer on the negative side of the mold;
decoupling the mold from the first powder box;
providing a second powder box containing a second polymeric powder;
coupling the mold to the second powder box;
rotating the mold and the second powder box, in a second rotation step, during which at least a portion of the second polymeric powder melts and forms a second polymer layer on the first polymer layer;
decoupling the mold from the second powder box;
heating the mold, in a post-cast heating step, to a post-cast temperature, wherein during the post-cast heating step, the second polymer layer expands from a first thickness to a second thickness;
compressing the second polymer layer to a third thickness;
cooling the mold; and
removing the trim panel from the mold, wherein the trim panel comprises the first polymer layer and the second polymer layer.

Enumerated Embodiment 2. The method of Enumerated Embodiment 1, wherein the first polymer layer is a skin layer and wherein the second polymer layer is a foam layer.

Enumerated Embodiment 3. The method of Enumerated Embodiment 1, wherein the first polymer layer has a thickness of about 0.6 mm.

Enumerated Embodiment 4. The method of Enumerated Embodiment 1, wherein the second thickness is about 3.5 mm.

Enumerated Embodiment 5. The method of Enumerated Embodiment 1, wherein the third thickness is about 2.5 mm.

Enumerated Embodiment 6. The method of Enumerated Embodiment 1, wherein heating the mold in the pre-cast heating step comprises heating the negative side and the positive side of the mold.

Enumerated Embodiment 7. The method of Enumerated Embodiment 1, wherein heating the mold in the pre-cast heating step comprises heating the positive side of the mold using an infrared heater.

Enumerated Embodiment 8. The method of Enumerated Embodiment 1, wherein heating the mold in the pre-cast heating step comprises heating the positive side of the mold using a plurality of infrared heating emitters.

Enumerated Embodiment 9. The method of Enumerated Embodiment 1, wherein heating the mold in the pre-cast heating step comprises heating the negative side of the mold using a convection heater.

Enumerated Embodiment 10. The method of Enumerated Embodiment 1, wherein the pre-cast temperature is about 243 degrees Celsius.

Enumerated Embodiment 11. The method of Enumerated Embodiment 1, wherein the pre-cast heating step has a duration of about 30 seconds.

Enumerated Embodiment 12. The method of Enumerated Embodiment 1, wherein the first rotation step has a duration of about 25 seconds.

Enumerated Embodiment 13. The method of Enumerated Embodiment 1, wherein the second rotation step has a duration of about 25 seconds.

Enumerated Embodiment 14. The method of Enumerated Embodiment 1, wherein during the first rotation step, the mold and the first powder box are rotated through at least two revolutions.

Enumerated Embodiment 15. The method of Enumerated Embodiment 1, wherein heating the mold in the post-cast heating step comprises heating the second polymer layer using a convection heater.

Enumerated Embodiment 16. The method of Enumerated Embodiment 1, wherein heating the mold in the post-cast heating step comprises heating the positive side of the mold using an infrared heater.

Enumerated Embodiment 17. The method of Enumerated Embodiment 1, wherein heating the mold in the post-cast heating step comprises heating the positive side of the mold using a plurality of infrared heating emitters.

Enumerated Embodiment 18. The method of Enumerated Embodiment 1, wherein the post-cast temperature is about 180 degrees Celsius.

Enumerated Embodiment 19. The method of Enumerated Embodiment 1, wherein the post-cast heating step has a duration of about 20 seconds.

Enumerated Embodiment 20. The method of Enumerated Embodiment 1, wherein the second polymeric powder comprises a foaming agent, wherein the foaming agent is configured to cause the second polymer layer to expand from the first thickness to the second thickness.

Enumerated Embodiment 21. The method of Enumerated Embodiment 1, further comprising, after decoupling the mold from the first powder box and before coupling the mold to the second powder box, heating the mold, in an interim heating step, to an interim temperature.

Enumerated Embodiment 22. The method of Enumerated Embodiment 21, wherein heating the mold in the interim heating step comprises heating the first polymer layer using a convection heater.

Enumerated Embodiment 23. The method of Enumerated Embodiment 21, wherein heating the mold in the interim heating step comprises heating the positive side of the mold using an infrared heater.

Enumerated Embodiment 24. The method of Enumerated Embodiment 21, wherein the interim temperature is about 200 degrees Celsius.

Enumerated Embodiment 25. The method of Enumerated Embodiment 21, wherein the interim heating step has a duration of about 5 seconds.

Enumerated Embodiment 26. The method of Enumerated Embodiment 1, wherein the step of compressing the second polymer layer has a duration of about 20 seconds.

Enumerated Embodiment 27. The method of Enumerated Embodiment 1, wherein the step of compressing the second polymer layer comprises pressing a calibration plug against the second polymer layer.

Enumerated Embodiment 28. The method of Enumerated Embodiment 27, wherein the calibration plug is pressed against the second polymer layer with a compression pressure of about 5 $lbf/in^2$.

Enumerated Embodiment 29. The method of Enumerated Embodiment 1, wherein cooling the mold comprises spraying the positive side of the mold with water.

Enumerated Embodiment 30. The method of Enumerated Embodiment 1, wherein cooling the mold comprises cooling the mold to a temperature of about 55 degrees Celsius.

Enumerated Embodiment 31. The method of Enumerated Embodiment 1, further comprising moving and rotating the mold using a mold transfer system, the mold transfer system comprising:
  a pair of rails; and
  a shuttle configured to travel on the rails, wherein the shuttle comprises: horizontal motion frame configured to move along the pair of rails;
    a vertical motion frame configured to couple with and move vertically with respect to the horizontal motion frame; and
    a rotational motion frame configured to couple with and rotate with respect to the vertical motion frame.

Enumerated Embodiment 32. A system configured to produce a dual layer part, the system comprising:
  a powder station having a first powder box and a second powder box;
  a heating station;
  a calibration station;
  a cooling station;
  a demold station; and
  a mold transfer system configured to move a mold to and from the powder station, the heating station, the calibration station, the cooling station, and the demold station;
  wherein the mold has a first side and a second side, and wherein a part having a first polymer layer and a second polymer layer on the first polymer layer is configured to be molded on the first side of the mold.

Enumerated Embodiment 33. The system of Enumerated Embodiment 32, wherein the mold transfer system comprises:
  a pair of rails; and
  a shuttle configured to travel on the rails.

Enumerated Embodiment 34. The system of Enumerated Embodiment 33, wherein the shuttle comprises:
  horizontal motion frame configured to move along the pair of rails;
  a vertical motion frame configured to couple with and move vertically with respect to the horizontal motion frame; and
  a rotational motion frame configured to couple with and rotate with respect to the vertical motion frame.

Enumerated Embodiment 35. The system of Enumerated Embodiment 34, wherein the rotational motion frame is configured to rotate the mold.

Enumerated Embodiment 36. The system of Enumerated Embodiment 32, wherein the mold includes one or more molds.

Enumerated Embodiment 37. The system of Enumerated Embodiment 32, wherein the powder station further comprises a pair of rails on which the first powder box and the second powder box are configured to move independently.

Enumerated Embodiment 38. The system of Enumerated Embodiment 32, wherein the first powder box is configured to hold a first polymeric powder and the second powder box is configured to hold a second polymeric powder.

Enumerated Embodiment 39. The system of Enumerated Embodiment 33, wherein the shuttle is configured to move perpendicular to movement of the first powder box and the second powder box.

Enumerated Embodiment 40. The system of Enumerated Embodiment 32, wherein the heating station comprises a first heater and a second heater, and wherein the first heater is located above the second heater.

Enumerated Embodiment 41. The system of Enumerated Embodiment 40, wherein the first heater comprises one or more infrared emitters.

Enumerated Embodiment 42. The system of Enumerated Embodiment 40, wherein the second heater comprises a convection heater.

Enumerated Embodiment 43. The system of Enumerated Embodiment 42, wherein the second heater comprises a lift configured to move the convection heater with respect to the first heater.

Enumerated Embodiment 44. The system of Enumerated Embodiment 32, wherein the calibration station comprises a calibration plug configured to be pressed against the second polymer layer during production of the part.

Enumerated Embodiment 45. The system of Enumerated Embodiment 44, wherein the calibration plug has a positive shape corresponding to but offset from the first side of the mold.

Enumerated Embodiment 46. The system of Enumerated Embodiment 32, wherein the cooling station comprises a plurality of spray nozzles configured to spray a cooling fluid onto the second side of the mold.

Enumerated Embodiment 47. A method of producing a part using a dual cast slush mold system, the method comprising;
 loading a mold having a negative side and a positive side onto a shuttle of a mold transfer system;
 moving the shuttle to a heating station, the heating station having a first heater and a second heater;
 heating the positive side of the mold using the first heater and heating the negative side of the mold using the second heater;
 moving the shuttle to a powder station having a first powder box and a second powder box;
 coupling the mold to the first powder box, the first powder box containing a first polymeric powder;
 molding a first polymer layer on the negative side of the mold by rotating the mold;
 decoupling the mold from the first powder box;
 coupling the mold to the second powder box, the second powder box containing a second polymeric powder;
 molding a second polymer layer on the first polymer layer by rotating the mold;
 moving the shuttle to the heating station;
 heating the second polymer layer using the second heater, during which the second polymer layer expands in thickness;
 moving the shuttle to a calibration station, the calibration station comprising a calibration plug;
 pressing the second polymer layer and the calibration plug together to compress the second polymer layer;
 moving the shuttle to a cooling station;
 cooling the positive side of the mold to reduce the temperature of the first polymer layer and the second polymer layer; and
 removing the part from the mold.

Enumerated Embodiment 48. A part comprising a first polymer layer and a second polymer layer, the part being manufactured by the steps comprising:
 heating a mold having a negative side and a positive side to a pre-cast temperature of about 243 degrees Celsius;
 coupling the mold to a first powder box containing a first polymeric powder;
 rotating the mold and the first powder box, in a first rotation step, during which at least a portion of the first polymeric powder melts and forms a first polymer layer on the negative side of the mold;
 decoupling the mold from the first powder box;
 coupling the mold to a second powder box containing a second polymeric powder;
 rotating the mold and the second powder box, in a second rotation step, during which at least a portion of the second polymeric powder melts and forms a second polymer layer on the first polymer layer;
 decoupling the mold from the second powder box;
 heating the mold to a post-cast temperature of about 180 degrees Celsius during which the second polymer layer forms into a foam;
 compressing the second polymer layer to a thickness of about 2.5 mm to about 3.5 mm;
 cooling the mold by spraying the positive side of the mold with a cooling fluid; and
 removing the part from the mold.

Enumerated Embodiment 49. A method of producing a part, the method comprising;
 heating a mold having a negative side and a positive side;
 rotating the mold to cause at least a portion of a first polymeric resin to contact the negative side of the mold;
 molding a first layer on the negative side of the mold by melting at least a portion of the first polymeric resin;
 rotating the mold to cause at least a portion of a second polymeric resin to contact the first layer; and
 molding a second layer on the first layer by melting at least a portion of the second polymeric resin.

Enumerated Embodiment 50. The method of Enumerated Embodiment 49, wherein during the step of heating the mold, the mold is heated to a temperature of about 243 degrees Celsius.

Enumerated Embodiment 51. The method of Enumerated Embodiment 49, further comprising heating the second layer, during which the second layer expands in thickness.

Enumerated Embodiment 52. The method of Enumerated Embodiment 51, wherein during the step of heating the second layer, the second layer is heated to a temperature of about 180 degrees Celsius.

Enumerated Embodiment 53. The method of Enumerated Embodiment 51, further comprising compressing the second layer.

Enumerated Embodiment 54. The method of Enumerated Embodiment 49, further comprising cooling the positive side of the mold to reduce the temperature of the first layer and the second layer.

Enumerated Embodiment 55. The method of Enumerated Embodiment 49, wherein the first layer is a skin layer and wherein the second layer is a foam layer.

Enumerated Embodiment 56. The method of Enumerated Embodiment 49, wherein the part is an automotive interior trim panel.

Enumerated Embodiment 57. A method of producing a part using a dual cast slush mold system, the method comprising;
 heating a mold having a negative side and a positive side;
 connecting the mold to a first box containing a first polymeric material;
 rotating the mold and the first box during which at least a portion of the first polymeric material melts and forms a first layer on the negative side of the mold;
 disconnecting the mold from the first box;
 connecting the mold to a second box containing a second polymeric material;
 rotating the mold and the second box during which at least a portion of the second polymeric material melts and forms a second layer on the first layer;
 heating the second layer, during which the second layer expands in thickness;
 compressing the second layer; and
 cooling the mold to reduce the temperature of the first layer and the second layer.

Enumerated Embodiment 58. The method of Enumerated Embodiment 57, wherein the first layer is a skin layer and wherein the second layer is a foam layer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing an automotive interior trim panel, the method comprising:
providing a mold having a negative side and a positive side;
heating the mold, by applying heat to the positive side of the mold using a first heater and the negative side of the mold using a second heater in a pre-cast heating step, to a pre-cast temperature, the second heater separate from the first heater, the second heater being a convection heater;
providing a first powder box containing a first polymeric powder;
coupling the mold to the first powder box;
rotating the mold and the first powder box, in a first rotation step, during which at least a portion of the first polymeric powder melts and forms a first polymer layer on the negative side of the mold;
decoupling the mold from the first powder box;
providing a second powder box containing a second polymeric powder;
coupling the mold to the second powder box;
rotating the mold and the second powder box, in a second rotation step, during which at least a portion of the second polymeric powder melts and forms a second polymer layer on the first polymer layer;
decoupling the mold from the second powder box;
heating the second polymer layer using only the second heater, in a post-cast heating step, to a post-cast temperature, wherein during the post-cast heating step, the second polymer layer expands from a first thickness to a second thickness;
compressing the second polymer layer to a third thickness by pressing a calibration plug against the second polymer layer with a compression force of 5 lbf/in$^2$ for a duration of 3 seconds to 30 seconds;
cooling the mold by spraying the positive side of the mold with a colling fluid to reduce the temperature of the first polymer layer and the second polymer layer; and
removing the trim panel from the mold, wherein the trim panel comprises the first polymer layer and the second polymer layer.

2. The method of claim 1, wherein the first polymer layer is a skin layer and wherein the second polymer layer is a foam layer.

3. The method of claim 1, wherein the first polymer layer has a thickness of 0.6 mm.

4. The method of claim 1, wherein the second thickness is 3.5 mm.

5. The method of claim 1, wherein the third thickness is 2.5 mm.

6. The method of claim 1, wherein the pre-cast temperature is 243 degrees Celsius.

7. The method of claim 1, wherein the post-cast temperature is 180 degrees Celsius.

8. The method of claim 1, wherein the second polymeric powder comprises a foaming agent, wherein the foaming agent is configured to cause the second polymer layer to expand from the first thickness to the second thickness.

9. The method of claim 1, further comprising, after decoupling the mold from the first powder box and before coupling the mold to the second powder box, heating the mold, in an interim heating step, to an interim temperature.

10. The method of claim 9, wherein the interim temperature is 200 degrees Celsius.

11. The method of claim 1, wherein cooling the mold comprises cooling the mold to a temperature of 55 degrees Celsius.

12. A method of producing a part, the method comprising:
heating a mold having a negative side and a positive side, wherein heating the mold is performed while the mold is held stationary;
rotating the mold in a range of 30 rpm to 60 rpm for a duration in a range of 10 seconds to 45 seconds to cause at least a portion of a first polymeric powder to contact the negative side of the mold;
molding a first layer on the negative side of the mold by melting at least a portion of the first polymeric powder;
rotating the mold in a range of 30 rpm to 60 rpm for a duration in a range of 10 seconds to 45 seconds to cause at least a portion of a second polymeric powder to contact the first layer;
molding a second layer on the first layer by melting at least a portion of the second polymeric powder; and
cooling the mold by spraying the positive side of the mold with a cooling fluid to reduce the temperature of the first layer and the second layer, wherein cooling the mold is performed while the mold is held stationary.

13. The method of claim 12, wherein during the step of heating the mold, the mold is heated to a temperature in a range of 240 degrees Celsius to 250 degrees Celsius.

14. The method of claim 12, further comprising heating the second layer, during which the second layer expands in thickness.

15. The method of claim 14, wherein during the step of heating the second layer, the second layer is heated to a temperature in a range of 180 degrees Celsius to 200 degrees Celsius.

16. The method of claim 14, further comprising compressing the second layer.

17. The method of claim 12, wherein the first layer is a skin layer and wherein the second layer is a foam layer.

18. The method of claim 12, wherein the part is an automotive interior trim panel.

19. A method of producing a part using a dual cast slush mold system, the method comprising:
providing a mold having a negative side and a positive side;
heating the positive side of the mold using a first heater, the first heater comprising one or more infrared emitters;
heating the negative side of the mold using a second heater, the second heater separate from the first heater, the second heater being a convection heater;
connecting the mold to a first box containing a first polymeric powder;
rotating the mold and the first box, in a first rotation step, during which at least a portion of the first polymeric powder melts and forms a first layer on the negative side of the mold;

disconnecting the mold from the first box;
connecting the mold to a second box containing a second polymeric powder;
rotating the mold and the second box, in a second rotation step, during which at least a portion of the second polymeric powder melts and forms a second layer on the first layer;
disconnecting the mold from the second box;
heating the second layer using only the second heater, during which the second layer expands in thickness;
compressing the second layer; and
cooling the mold to reduce the temperature of the first layer and the second layer.

20. The method of claim 19, wherein:
during the first rotation step the mold is rotated in a range of 30 rpm to 60 rpm, and wherein the first rotation step has a duration in a range of 10 seconds to 45 seconds;
during the second rotation step the mold is rotated in a range of 30 rpm to 60 rpm, and wherein the second rotation step has a duration in a range of 10 seconds to 45 seconds; and
holding the mold stationary during cooling the mold.

\* \* \* \* \*